(12) United States Patent
Kitamura et al.

(10) Patent No.: US 12,269,483 B2
(45) Date of Patent: Apr. 8, 2025

(54) PHYSIQUE ESTIMATION DEVICE, PHYSIQUE ESTIMATION METHOD, SEATBELT REMINDER SYSTEM, AND AIRBAG CONTROL SYSTEM

(71) Applicant: Mitsubishi Electric Corporation, Tokyo (JP)

(72) Inventors: Takayuki Kitamura, Tokyo (JP); Kei Suwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 233 days.

(21) Appl. No.: 18/186,419

(22) Filed: Mar. 20, 2023

(65) Prior Publication Data

US 2023/0227045 A1 Jul. 20, 2023

Related U.S. Application Data

(63) Continuation of application No. PCT/JP2020/043384, filed on Nov. 20, 2020.

(51) Int. Cl.
*B60W 40/08* (2012.01)
(52) U.S. Cl.
CPC ..... *B60W 40/08* (2013.01); *B60W 2040/0881* (2013.01); *B60W 2554/20* (2020.02)
(58) Field of Classification Search
CPC ......... B60W 40/08; B60W 2040/0881; B60W 2554/20; B60W 50/14; B60W 2050/143; B60W 2050/146; B60R 21/015
See application file for complete search history.

(56) References Cited

U.S. PATENT DOCUMENTS

| 6,078,854 A | 6/2000 | Breed et al. |
| 6,134,492 A | 10/2000 | Breed et al. |
| 7,738,678 B2 * | 6/2010 | Breed ............... B60R 21/01538 382/103 |

(Continued)

FOREIGN PATENT DOCUMENTS

| JP | 8-127264 A | 5/1996 |
| JP | 11-45398 A | 2/1999 |

(Continued)

OTHER PUBLICATIONS

Huh et al., "Seat Belt Reminder System In Vehicle Using IR-UWB Radar", International Conference on Network Infrastructure and Digital Contetnt, Aug. 22-24, 2018, pp. 256-259.

(Continued)

*Primary Examiner* — Kenny Nguyen
(74) *Attorney, Agent, or Firm* — Birch, Stewart, Kolasch & Birch, LLP

(57) ABSTRACT

Disclosed is a physique estimation device that can estimate a physique. The physique estimation device includes: a sensor having a transmission antenna to transmit a transmission wave, and a reception antenna to receive the transmission wave reflected by at least one target in a vehicle cabin as a received wave; a frequency analysis unit to acquire position information about a reflection point where the transmission wave is reflected using the received wave; and a physique estimation unit to estimate the physique of a non-static object present in the vehicle cabin using the position information.

15 Claims, 12 Drawing Sheets

(56) References Cited

U.S. PATENT DOCUMENTS

| | | | | |
|---|---|---|---|---|
| 9,020,637 | B2* | 4/2015 | Schnittman | G05D 1/0227 382/106 |
| 10,867,191 | B2* | 12/2020 | Steyer | G01S 13/931 |
| 11,230,293 | B2* | 1/2022 | Gomez | G01S 13/18 |
| 11,815,602 | B2* | 11/2023 | You | G01S 17/931 |
| 11,851,014 | B2* | 12/2023 | Torabi | G06N 3/02 |
| 12,011,097 | B2* | 6/2024 | Yetukuri | G01S 7/415 |
| 2006/0103927 | A1 | 5/2006 | Samukawa et al. | |
| 2009/0092284 | A1* | 4/2009 | Breed | B60N 2/0028 382/103 |
| 2014/0129027 | A1* | 5/2014 | Schnittman | G05D 1/0219 700/253 |
| 2015/0205299 | A1* | 7/2015 | Schnittman | G05D 1/0227 901/1 |
| 2018/0047287 | A1 | 2/2018 | Shimotsuma et al. | |
| 2018/0272977 | A1 | 9/2018 | Szawarski et al. | |
| 2018/0300561 | A1* | 10/2018 | Steyer | G01S 13/726 |
| 2019/0018133 | A1 | 1/2019 | Takada | |
| 2020/0256999 | A1 | 8/2020 | Yellepeddi et al. | |
| 2020/0271787 | A1* | 8/2020 | You | G01S 7/4913 |
| 2021/0245763 | A1* | 8/2021 | Gomez | G01S 7/2883 |
| 2022/0095811 | A1* | 3/2022 | Yetukuri | A47C 31/126 |
| 2022/0268929 | A1* | 8/2022 | Hariyama | G01S 17/34 |
| 2022/0306027 | A1* | 9/2022 | Lee | B60R 21/01512 |
| 2022/0355755 | A1* | 11/2022 | Fischer | B60R 21/2338 |

FOREIGN PATENT DOCUMENTS

| | | |
|---|---|---|
| JP | 2001-508732 A | 7/2001 |
| JP | 2003-194922 A | 7/2003 |
| JP | 2006-146372 A | 6/2006 |
| JP | 2010-160777 A | 7/2010 |
| JP | 2018-25957 A | 2/2018 |
| JP | 2019-20158 A | 2/2019 |
| JP | 2020-104680 A | 7/2020 |

OTHER PUBLICATIONS

International Seaarch Report (PCT/ISA/210) issued in PCT/JP2020/043384, dated Jan. 26, 2021.

* cited by examiner

PHYSIQUE ESTIMATION DEVICE, PHYSIQUE ESTIMATION METHOD, SEATBELT REMINDER SYSTEM, AND AIRBAG CONTROL SYSTEM

CROSS REFERENCE TO RELATED APPLICATIONS

This application is a Continuation of PCT International Application No. PCT/JP2020/043384, filed on Nov. 20, 2020, all of which is hereby expressly incorporated by reference into the present application.

TECHNICAL FIELD

The present disclosure relates to a physique estimation device and a physique estimation method, and a seatbelt reminder system and an airbag control system which use the physique estimation device.

BACKGROUND ART

In Patent Literature 1, an occupant detecting device that has a Doppler sensor disposed inside a seat cushion of a vehicle to emit an electromagnetic beam toward a reflecting plate of a seat pad and to detect a displacement speed of the seat pad, the displacement speed varying depending on a load, and that determines the presence or absence of an occupant on the basis of the displacement speed of the seat pad detected by the Doppler sensor is disclosed.

CITATION LIST

Patent Literature

Patent Literature 1: JP H08-127264 A

SUMMARY OF INVENTION

Technical Problem

Although the technology of Patent Literature 1 makes it possible to detect the presence or absence of an occupant, a problem with the technology is that the occupant's physique cannot be estimated.

The present disclosure is made in order to solve the above-mentioned problem, and a purpose according to an aspect of the embodiments of this disclosure is to provide a physique estimation device that can estimate an occupant's physique.

Solution to Problem

An aspect of a physique estimation device according to the embodiments comprises a sensor having a transmission antenna to transmit a transmission wave comprising multiple chirps whose frequencies rise or fall, a reception antenna to receive the transmission wave reflected by multiple targets in a vehicle cabin as a received wave, and a mixer to mix the transmission wave and the received wave to generate beat signals; and
 processing circuitry
  to acquire position information about a reflection point where the transmission wave is reflected, using the received wave and analyzing the beat signals; and
  to estimate a physique of a non-static object present in the vehicle cabin using the position information, wherein the processing circuitry determines a movable body occupancy probability showing a probability of presence of a non-static object in each of multiple cells contained in three-dimensional grid space and showing an inside of the vehicle cabin, and estimates a spatial extent of cells whose movable body occupation probabilities are greater than or equal to a threshold as the physique of the non-static object present in the vehicle cabin, and wherein the processing circuitry is further configured:
 to determine whether a detected target is a non-static object or a static object;
 to,
  when a non-static object is detected in a case where either multiple non-static objects or at least one non-static object and at least one static object are detected as the multiple targets, set a temporary movable body occupancy probability of one or more cells corresponding to a position of the detected non-static object to a value close to 1, set a temporary movable body occupancy probability of each cell at a position between the position of the detected non-static object and the sensor to a value which asymptotically varies to 0 with distance from the position of the detected non-static object toward the sensor, and set a temporary movable body occupancy probability of each cell at a position which is away from the position of the non-static object when viewed from the sensor to 0.5,
  when a static object is detected in the above case, set a temporary movable body occupancy probability of each of one or more cells corresponding to a position of the detected static object, and a temporary movable body occupancy probability of each cell which is away from the position of the detected static object when viewed from the sensor to 0.5, and set a temporary movable body occupancy probability of each cell at a position between the position of the detected static object and the sensor to a value which asymptotically varies to 0 with distance from the position of the detected static object toward the sensor,
  when multiple non-static objects are detected in the above case, determine a product of one or more temporary movable body occupation probabilities which are set when a non-static object is detected for each of the cells, to update it as a new temporary movable body occupancy probability of the cell, or
  when at least one non-static object and at least one static object are detected in the above case, determine a product of one or more temporary movable body occupation probabilities which are set when a non-static object is detected and one or more temporary movable body occupation probabilities which are set when a static object is detected for each of the cells, and to calculate the product as a new temporary movable body occupancy probability of the cell;
 to determine, as to the movable body occupancy probability of each of the cells, a weighted average of the movable body occupancy probability in measurement cycles containing up to an immediately preceding measurement cycle and the temporary movable body occupancy probability in a current measurement cycle as the movable body occupancy probability in measurement cycles containing up to the current measurement cycle; and
 to assign the movable body occupancy probability in the measurement cycles containing up to the current measurement cycle to each of the cells as the movable body occupancy probability, and generate an occupancy grid map.

Advantageous Effects of Invention

Physique estimation devices according to embodiments make it possible to estimate the physique of a non-static object.

DESCRIPTION OF EMBODIMENTS

Figure 1:
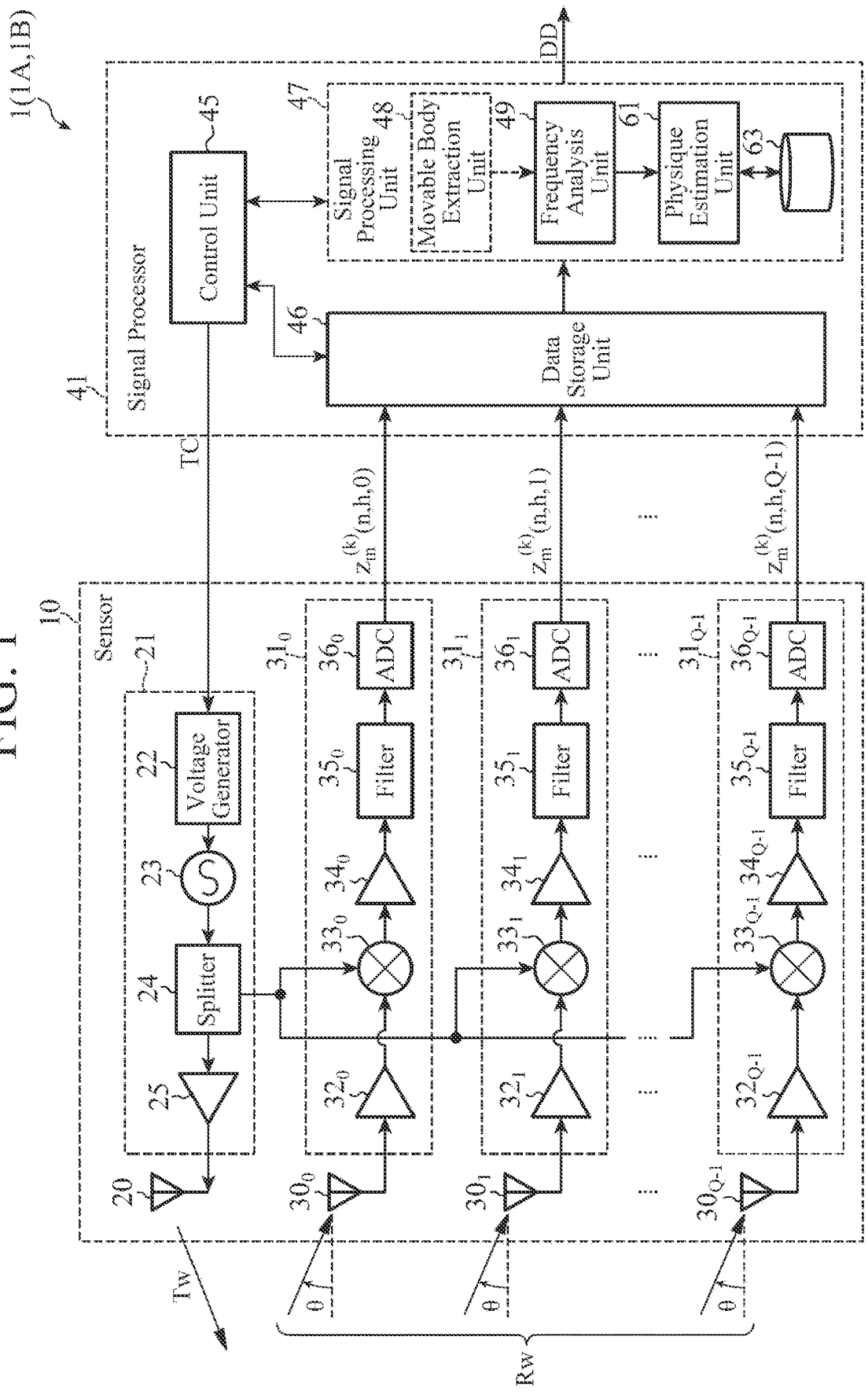
FIG. 1 is a block diagram schematically showing the configuration of a physique estimation device according to Embodiment 1 of the present disclosure.

Hereinafter, various embodiments according to the present disclosure will be explained in detail while referring to the drawings. It is assumed that the components denoted by the same reference sign throughout the drawings have the same configuration or a similar configuration, or the same function or a similar function.

Embodiment 1

<Configuration>

FIG. 1 is a block diagram schematically showing the configuration of a physique estimation device 1 according to Embodiment 1 of the present disclosure. As shown in FIG. 1, the physique estimation device 1 is configured to include a sensor 10 and a signal processor 41 which operates in cooperation with this sensor 10. The physique estimation device 1 is intended for estimating the physique of a non-static object including a movable body such as an occupant in a vehicle, and is placed in such a way as to transmit a transmission wave Tw toward an occupant in a vehicle cabin, and to receive a reflected wave Rw from the occupant. Here, a "vehicle" refers to a conveyance having wheels, and a car, a bus, and a truck are included in examples of a vehicle. Further, a "non-static object" refers to an object other than static objects, and a movable body which can move by itself and an object which cannot move by itself, but can be moved by an action of an external force are included in examples of a non-static object. In the following explanation, for the sake of simple explanation, embodiments of the present disclosure will be explained using the following term: a movable body, an occupant, or a person, which is an example of a non-static object. Further, "physique" means the three-dimensional size of a movable body such as a person.

The sensor 10 includes a transmission circuit 21, a transmission antenna 20, multiple reception antennas $30_0$ to $30_{Q-1}$, and multiple receivers $31_0$ to $31_{Q-1}$ disposed respectively corresponding to the multiple reception antennas $30_0$ to $30_{Q-1}$.

The transmission circuit 21 includes a voltage generator 22, a voltage control oscillator 23, a splitter 24, and an amplifier 25, and generates a frequency modulated wave in a high frequency band such as a millimeter wave band (approximately 30 GHz to 300 GHz). The voltage generator 22 generates a modulation voltage in accordance with a control signal TC supplied thereto from the signal processor 41, and supplies the modulation voltage generated thereby to the voltage control oscillator 23. The voltage control oscillator 23 repeatedly outputs a frequency modulated wave signal having a modulation frequency which rises or falls over time depending on the modulation voltage supplied thereto in accordance with a predetermined frequency modulation method. As the predetermined frequency modulation method, for example, a frequency modulated continuous wave (FMCW) method or a fast-chirp modulation (FCM) method can be used. According to the FMCW or FCM method, the frequency of the frequency modulated wave signal, i.e., the transmission frequency is swept in such a way as to continuously rise or fall over time within a certain frequency band. The splitter 24 splits the frequency modulated wave signal inputted from the voltage control oscillator 23 into a transmission wave signal and a local signal. The splitter 24 supplies the transmission wave signal to the amplifier 25 and at the same time, supplies the local signal to the receivers $31_0$ to $31_{Q-1}$. The transmission wave signal is amplified by the amplifier 25. The transmission antenna 20 transmits a transmission wave Tw (chirp) based on the output signal of the amplifier 25 to an observation space (i.e., the inside of the vehicle cabin).

The reception antennas $30_0$ to $30_{Q-1}$ are arranged in a linear shape, a planar shape, or a curved surface shape in such a way as to receive, as a received wave, a reflected wave Rw which has occurred because of the reflection of the transmission wave Tw in the vehicle. Q is an integer greater than or equal to 3 which shows the number of reception antennas $30_0$ to $30_{Q-1}$ (the number of reception channels).

The receivers $31_0$ to $31_{Q-1}$ are disposed corresponding to the reception antennas $30_0$ to $30_{Q-1}$. The q-th receiver $31q$ has a low noise amplifier (LNA) $32_q$, a mixer $33_q$, an IF amplifier $34_q$, a filter $35_q$, and an A/D converter (ADC) $36_q$. Here, q is an arbitrary integer within a range of 0 to Q−1.

The low noise amplifier $32_q$ amplifies the output signal of the reception antenna $30_q$, and outputs the amplified signal to the mixer $33_q$. The mixer $33_q$ mixes the amplified signal and the local signal supplied thereto from the splitter 24, to generate a beat signal in an intermediate frequency band. The IF amplifier $34_q$ amplifies the beat signal inputted thereto from the mixer $33_q$, and outputs the amplified beat signal to the filter $35_q$. The filter $35_q$ suppresses unnecessary frequency components in the amplified beat signal, and outputs an analog reception signal. The ADC $36_q$ converts the analog reception signal into a digital reception signal $z_m^{(k)}$ (n, h, q) at a predetermined sample rate, and outputs the digital reception signal to the signal processor 41. Here, k is an integer showing a frame number, n is an integer showing a sample number, and h is an integer showing a chirp number.

The signal processor 41 includes a data storage unit 46, a signal processing unit 47, and a control unit 45 which controls the operations of the transmission circuit 21, the data storage unit 46, and the signal processing unit 47.

The data storage unit 46 temporarily stores the reception signals inputted in parallel thereto from the receivers $31_0$ to $31_{Q-1}$. As the data storage unit 46, a random access memory (RAM) having a high speed response performance can be used.

The control unit 45 supplies the control signal TC for generating the modulation voltage to the transmission circuit 21. The control unit 45 can also perform control to read and write a signal from and to the data storage unit 46.

The signal processing unit 47 performs digital signal processing on the reception signals read from the data storage unit 46, and identifies a target object within the observation space. As shown in FIG. 1, the signal processing unit 47 includes a movable body extraction unit 48, a frequency analysis unit 49, a physique estimation unit 61, and a map storage unit 63. The movable body extraction unit 48 is an optional component, and the signal processing unit 47 does not need to include the movable body extraction unit 48. Hereinafter, an embodiment in which the movable body extraction unit 48 is included in the signal processing unit 47 will be explained.

The movable body extraction unit 48 is a processing unit which performs a movable body extraction process of reading the sampled beat signals from the data storage unit 46, and extracting a movable body (moving target). Concretely, by applying an MTI filter to the read signals, a signal component having a relative low frequency, the signal component being caused by a static object, is eliminated, and a signal component having a relative high frequency from a movable body is extracted. The movable body extraction unit 48 supplies the extracted signal to the frequency analysis unit 49.

Figure 2:
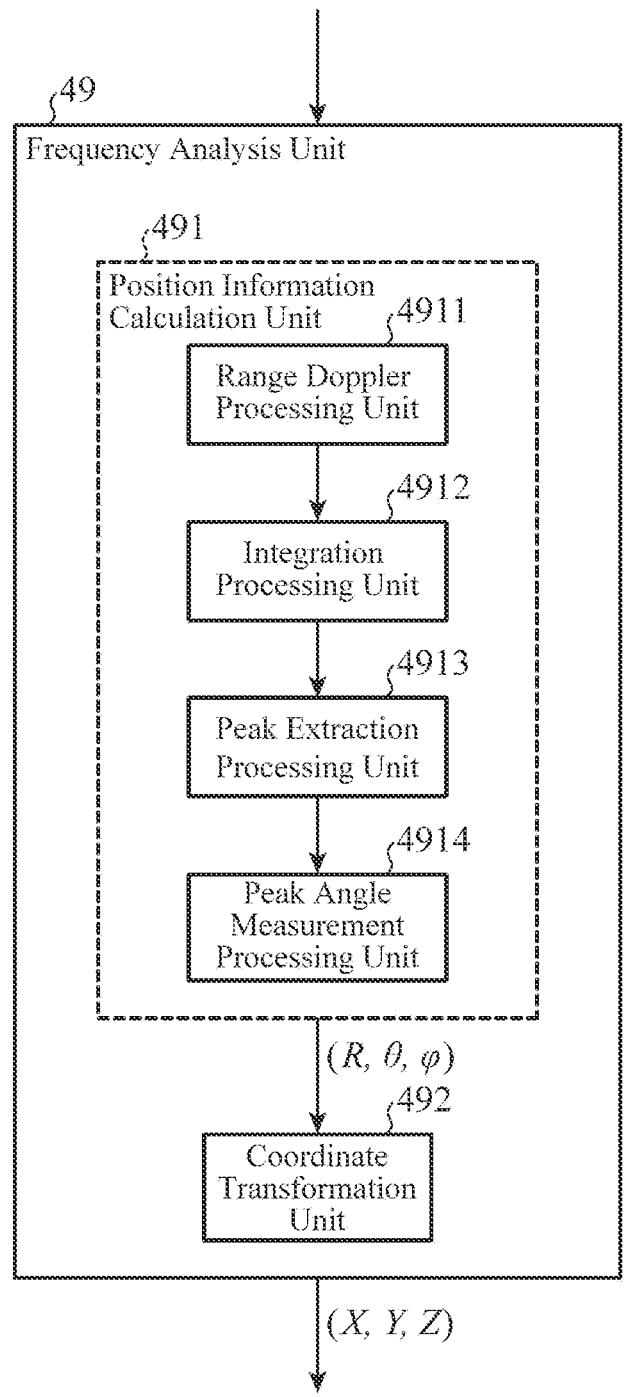
FIG. 2 is a block diagram showing the configuration of a frequency analysis unit according to Embodiment 1.

The frequency analysis unit 49 performs a frequency analysis on the signal received from the movable body extraction unit 48, and supplies a result of the frequency analysis to the physique estimation unit 61. In the case of an embodiment in which the movable body extraction unit 48 is not included, the frequency analysis unit 49 reads the sampled beat signals from the data storage unit 46, and performs a frequency analysis on the beat signals. The details of the processing performed by the frequency analysis unit 49 will be explained by referring to FIG. 2. FIG. 2 is a block diagram showing the configuration of the frequency analysis unit of Embodiment 1. As shown in FIG. 2, the frequency analysis unit 49 includes a position information calculation unit 491 and a coordinate transformation unit 492. The position information calculation unit 491 includes a range Doppler processing unit 4911, an integration processing unit 4912, a peak extraction processing unit 4913, and a peak angle measurement processing unit 4914.

The range Doppler processing unit 4911 performs a range fast Fourier transform (FFT) and a Doppler FFT on the signal received from the movable body extraction unit 48, to generate a range Doppler map. In the sensor based on the FMCW method or the FCM method, one chirp reflected by a target and received is received while being delayed by a time proportional to the distance from the sensor to the target, and a different chirp reflected by the target and received contains a Doppler shift between the sensor and the target. Therefore, in order to extract a distance component first, the range Doppler processing unit 4911 performs a range FFT on the signal received from the movable body extraction unit 48 on a per-chirp basis (i.e., multiple times whose number is equal to the number of chirps), and performs a transformation based on Equation (1) on the signal on which the range FFT is performed.

$$R = \frac{cT_c \Delta f}{2B} \tag{1}$$

Here, c is the speed of light, Tc is the duration of each chirp, Δf is the difference between the transmission frequency and the reception frequency, and B is the bandwidth of each chirp. By performing a transformation based on Equation (1), data in a range direction is generated for each chirp.

Next, in order to extract a relative speed component, the range Doppler processing unit 4911 arranges the data in the range direction acquired for each chirp in chronological order. More specifically, the range Doppler processing unit 4911 arranges the data in the range direction acquired for each chirp in order of increasing chirp number. After that, the range Doppler processing unit 4911 performs a Doppler FFT on the pieces of data in the range direction arranged in chronological order. More concretely, the range Doppler processing unit 4911 performs a Doppler FFT on pieces of data having different chirp numbers, but having the same distance on a per-range basis (i.e., multiple times whose number is equal to the number of range bins). As a result, a range Doppler map which is three-dimensional data having a signal strength corresponding to a distance R and a Doppler frequency $f_d$ is generated. The generated range Doppler map is supplied to the integration processing unit 4912.

The integration processing unit 4912 performs incoherent integration processing on all the range Doppler maps received from the range Doppler processing unit 4911, to improve a signal to noise ratio (SNR). A range Doppler map acquired after the incoherent integration processing is supplied to the peak extraction processing unit 4913.

The peak extraction processing unit 4913 performs a two-dimensional peak extraction process on the range Doppler map received from the integration processing unit 4912, to detect a target signal. A two-dimensional constant false alarm rate (CFAR) is included in examples of the two-dimensional peak extraction process. The two-dimensional peak extraction process is performed on three or more antennas arranged. The peak extraction processing unit 4913 supplies two-dimensional peak data extracted thereby to the peak angle measurement processing unit 4914.

The peak angle measurement processing unit 4914 performs an angle FFT across the different antennas on the two-dimensional peak data extracted for each antenna, to acquire angle data. Even though two pieces of two-dimensional peak data are at a position having the same range and the same Doppler measure on the range Doppler map, they have a phase difference ΔΦ corresponding to the distance d between the antennas. Therefore, the peak angle measurement processing unit 4914 performs an angle FFT across the different antennas, to determine an azimuth angle θ.

$$\theta = \sin^{-1}\left(\frac{\lambda \Delta \phi}{2\pi d}\right) \quad (2)$$

Similarly, the peak angle measurement processing unit 4914 performs an angle FFT across the different antennas, to determine an elevation angle φ. The peak angle measurement processing unit 4914 supplies polar coordinate data (R, θ, φ) which is the result acquired through the frequency analysis to the coordinate transformation unit 492.

The coordinate transformation unit 492 transforms position information calculated by the position information calculation unit 491 into position information in a vehicle fixed coordinate system, in accordance with the following Equations (3) and (4). Equation (3) is a transformation for transforming a polar coordinate system in which position measurement is performed into a rectangular coordinate system x'y'z' of the sensor. Equation (4) is a transformation for transforming the rectangular coordinate system x'y'z' of the sensor into the fixed coordinate system xyz of the vehicle. It is assumed that the sensor rectangular coordinate system x'y'z' is obtained by rotating the vehicle fixed coordinate system xyz through an angle A about the x-axis (=x'-axis). The position information (X, Y, Z) after transformation is supplied to the physique estimation unit 61.

$$r' = \begin{bmatrix} x' \\ y' \\ z' \end{bmatrix} = \begin{bmatrix} R\cos\varphi\sin\theta \\ R\cos\varphi\cos\theta \\ R\sin\varphi \end{bmatrix} \quad (3)$$

$$r = \begin{bmatrix} x \\ y \\ z \end{bmatrix} = \begin{bmatrix} 1 & 0 & 0 \\ 0 & \cos\delta & -\sin\delta \\ 0 & \sin\delta & \cos\delta \end{bmatrix} r' \quad (4)$$

Returning to FIG. 1, the configuration of the signal processing unit 47 will be explained. The physique estimation unit 61 generates a three-dimensional map showing the presence position of a reflection point in the three-dimensional space of an observation target using the position information about the reflection point, the position information being acquired from the position information calculation unit 491. In this embodiment, the three-dimensional space of an observation target is physical space where persons are assumed to be present in the vehicle. The three-dimensional space of an observation target is expressed, in observational data space, as, for example, three-dimensional grid space including a three-dimensional grid. The three-dimensional grid space is expressed as, for example, a three-dimensional grid map m which contains multiple cells formed with grid lines spaced at an equal interval and which is expressed by a three-dimensional rectangular coordinate system. Each of the cells is uniquely specified by a combination of a number $m_x$ showing the position in an x direction, a number $m_y$ showing the position in a y direction, and a number $m_z$ showing the position in a z direction. The physique estimation unit 61 generates an occupancy grid map showing whether an object to be detected is present in each of the cells of the three-dimensional grid map m.

A three-dimensional grid map m before observation showing the space in the vehicle is previously stored in the map storage unit 63. The three-dimensional grid map m may be generated by the signal processing unit 47 when the physique estimation device 1 is started. The physique estimation unit 61 reads the three-dimensional grid map m from the map storage unit 63 at a time of observation of the space in the vehicle, and plots the coordinates of the position of a reflection point which are supplied from the frequency analysis unit 49 on the three-dimensional grid map m. On the basis of a result of this plot, an occupancy grid map in which the probability of presence of a movable body is held at each cell which constitutes the three-dimensional grid map m is generated.

Figure 3:
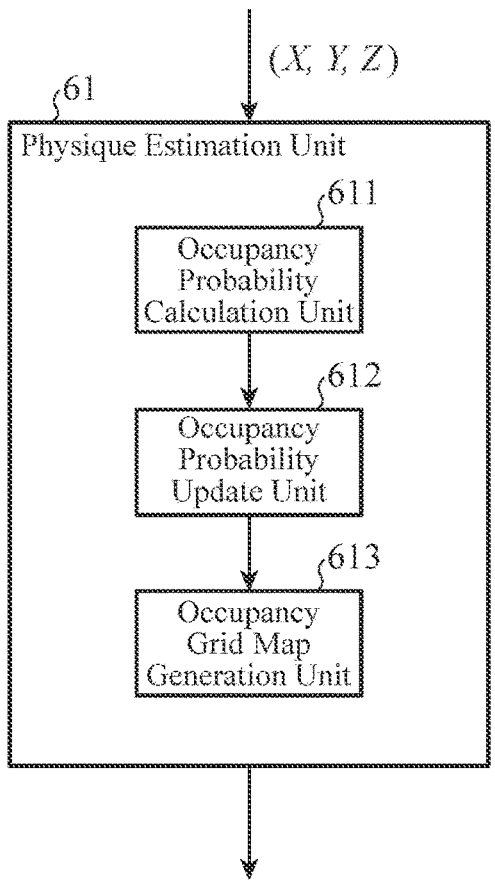
FIG. 3 is a block diagram showing the configuration of a physique estimation unit according to Embodiment 1.

Hereinafter, the details of the configuration of the physique estimation unit 61 will be explained by referring to FIG. 3. As shown in FIG. 3, the physique estimation unit 61 includes an occupancy probability calculation unit 611, an occupancy probability update unit 612, and an occupancy grid map generation unit 613.

The occupancy probability calculation unit 611 calculates a temporary occupancy probability showing the probability that the movable body is present in each cell in a certain specific measurement cycle on the basis of the plot result. Concretely, when a detected value vector $z_n$ showing the xyz coordinates of a detection point is inputted in the n-th measurement cycle, a temporary movable body occupancy probability $p(m_{xyz}|z_n)$ showing that the movable body is present in a cell $m_{xyz}$ on the occupancy grid map, the cell corresponding to the vector $z_n$, is calculated in accordance with the following Equation (5). Because it can be assumed that every detection point provided by the movable body extraction unit 48 shows the movable body, a temporary movable body occupancy probability $p(m_{xyz}|z_n)$ 1 is assigned to the cell $m_{xyz}$ corresponding to the detected value vector $z_n$. A temporary movable body occupancy probability $p(m_{xyz}|z_n)$ 0 is assigned to the other cells.

Similarly, when the detected value vector $z_n$ showing the coordinates of the detection point is inputted in the (n+1)-th measurement cycle, the temporary movable body occupancy probability $p(m_{xyz}|z_n)$ 1 is assigned to the cell $m_{xyz}$ corresponding to the vector $z_n$, and the temporary movable body occupancy probability $p(m_{xyz}|z_n)$ 0 is assigned to the other cells. The calculation of the temporary movable body occupancy probability $p(m_{xyz}|z_n)$ is performed every time the detected value $z_n$ is inputted.

The occupancy probability calculation unit 611 supplies the temporary movable body occupancy probability $p(m_{xyz}|z_n)$ in a specific measurement cycle to the occupancy probability update unit 612.

$$\begin{cases} p(m_{xyz}|z_n) = 1 \text{ (when a movable body is present on the cell } m_{xyz}) \\ p(m_{xyz}|z_n) = 0 \text{ (when no movable body is present on the cell } m_{xyz}) \end{cases} \quad (5)$$

Using the temporary movable body occupancy probability $p(m_{xyz}|z_n)$ supplied from the occupancy probability calculation unit 611, the occupancy probability update unit 612 updates the movable body occupancy probability $p(m_{xyz}$ $|z_{1:n}$) which is based on the detected values $z_{1:n}$ in all the measurement cycles from the first measurement cycle to the n-th measurement cycle and which shows the probability that the movable body is present in each cell $m_{xyz}$, in accordance with the following Equation (6).

$$p(m_{xyz}|z_{1:n}) = \min\{(1-w)\cdot p(m_{xyz}|z_{1:n-1}) + w\cdot p(m_{xyz}|z_n), 1\} \quad (6)$$

$z_{1:n-1}$ shows all the detected values in the measurement cycles from the first measurement cycle to the (n−1)-th measurement cycle. A coefficient w shows a weight. A function min{a, b} is a min function which returns a minimum value out of arguments a and b. As shown in Equation (6), the movable body occupancy probability is limited to an upper limit 1 and is adjusted in such a way as not to exceed 1.

When measurement is performed only one time, there may occur a measurement error such as a missed detection in which a target cannot be detected although the target is present, or a false alarm in which a target is detected although the target is not present. As shown in this Embodiment, such a measurement error can be prevented by updating the final movable body occupancy probability based on both the movable body occupancy probability which is determined from the pieces of detection data in the measurement cycles containing up to an immediately preceding measurement cycle and the temporary movable body occupancy probability which is determined from the detection data in a current measurement cycle.

The occupancy grid map generation unit 613 causes each cell to hold the movable body occupancy probability $p(m_{xyz}|z_{1:n})$ determined thereby. More specifically, with each cell is brought into correspondence the determined movable body occupancy probability $p(m_{xyz}|z_{1:n})$. As a result, an occupancy grid map showing the probability that the movable body is present in each cell of the space m is generated. The physique of the movable body can be estimated from the spatial extent of the cells having the movable body occupancy probability $p(m_{xyz}|z_{1:n})$ greater than or equal to a predetermined threshold ε (e.g., 0.8). Three-dimensional imaging may be performed on the basis of the movable body occupancy probability. For example, the cells having the movable body occupancy probability $p(m_{xyz}|z_{1:n})$ greater than or equal to the predetermined threshold (e.g., 0.8) are displayed in black, while the cells having the movable body occupancy probability $p(m_{xyz}|z_{1:n})$ less than the threshold are displayed in white.

Figure 4A:
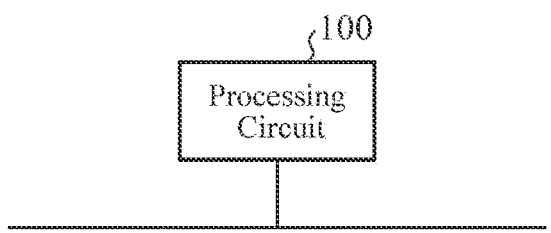
FIG. 4A is a block diagram showing an example of the hardware configuration of a signal processing unit according to Embodiment 1.

Next, the hardware configuration of the signal processor 41 will be explained by referring to FIGS. 4A and 4B. As an example, the control unit 45, the movable body extraction unit 48, the frequency analysis unit 49, and the physique estimation unit 61 of the signal processor 41 are implemented by a processing circuit 100, as shown in FIG. 4A. The processing circuit 100 is, for example, a single circuit, a composite circuit, a programmable processor, a parallel programmable processor, an application specific integrated circuit (ASIC), a field-programmable gate array (FPGA), or a combination of these circuits. The functions of the control unit 45, the movable body extraction unit 48, the frequency analysis unit 49, and the physique estimation unit 61 may be implemented by separate processing circuits, or those functions may be implemented collectively by a single processing circuit.

Figure 4B:
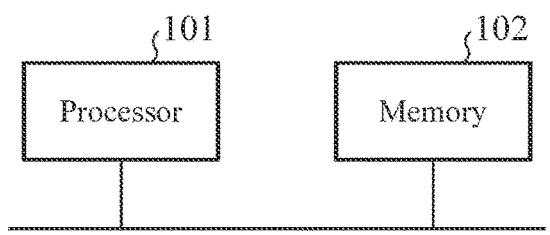
FIG. 4B is a block diagram showing another example of the hardware configuration of the signal processing unit according to Embodiment 1.

As another example, the control unit 45, the movable body extraction unit 48, the frequency analysis unit 49, and the physique estimation unit 61 of the signal processor 41 are implemented by a processor 101 and a memory 102, as shown in FIG. 4B. By reading a program stored in the memory 102 to the processor 101 and executing the program, the control unit 45, the movable body extraction unit 48, the frequency analysis unit 49, and the physique estimation unit 61 are implemented. The program is implemented as software, firmware, or a combination of software and firmware. As an example of the memory 102, for example, a non-volatile or volatile semiconductor memory, such as a random access memory (RAM), a read only memory (ROM), a flash memory, an erasable programmable read only memory (EPROM), or an electrically-EPROM (EEPROM), a magnetic disc, a flexible disc, an optical disc, a compact disc, a mini disc, or a DVD is included.

<Operation>

Figure 5:
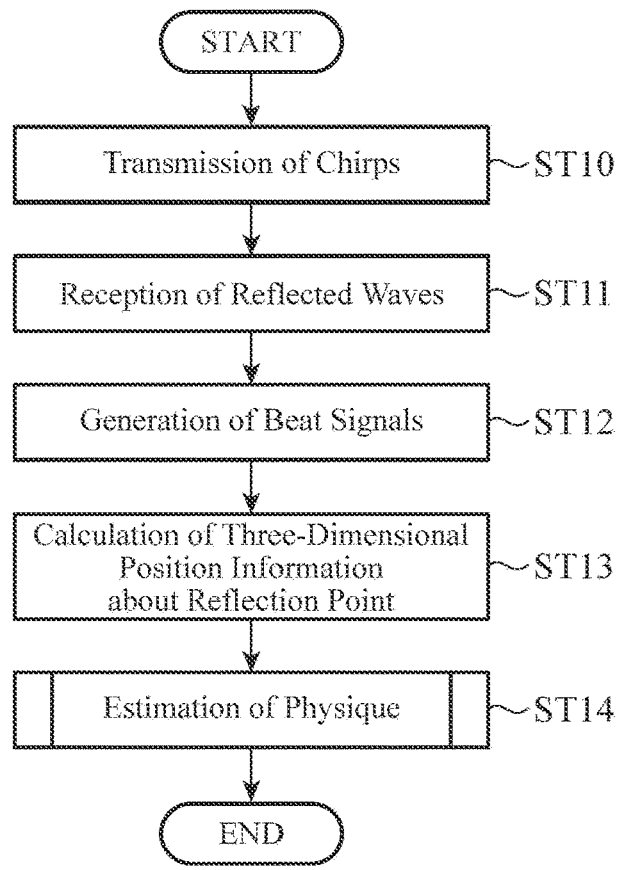
FIG. 5 is a flowchart showing the operation of the physique estimation device according to Embodiment 1.
Figure 6:
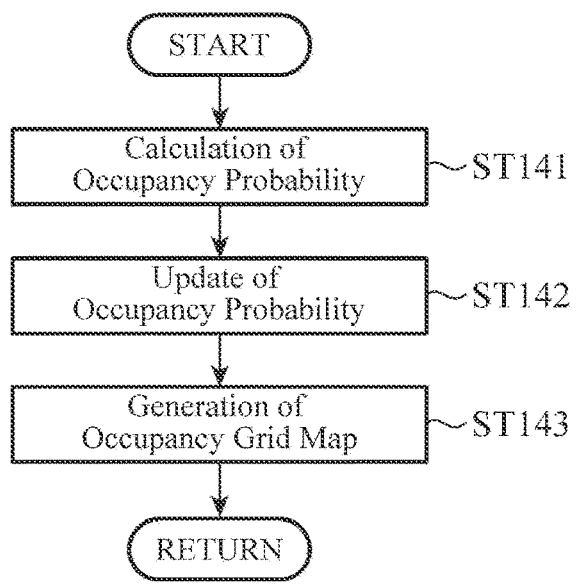
FIG. 6 is a detailed flowchart of physique estimation processing according to Embodiment 1.

Next, the operation of the physique estimation device 1 will be explained by referring to FIGS. 5 and 6. FIG. 5 is a flowchart showing the operation of the physique estimation device 1, and FIG. 6 is a detailed flowchart of a process in step ST14 of FIG. 5. The processing of FIG. 5 is started by the switching on of the power supply of the physique estimation device 1 in synchronization with, for example, the switching on of the ignition of the vehicle.

In step ST10, a transmission wave is transmitted to the space in the vehicle via the transmission antenna 20. Concretely, a frequency-modulated chirp is transmitted to the space in the vehicle via the transmission antenna 20.

In step ST11, the chirp reflected by a target in the vehicle is received via the reception antennas $30_0$ to $30_{Q-1}$.

In step ST12, the transmission chirp and reception chirps received by the reception antennas $30_0$ to $30_{Q-1}$ are mixed by the mixers $33_0$ to $33_{Q-1}$, so that beat signals whose number is equal to the number of reception antennas $30_0$ to $30_{Q-1}$ are generated.

In step ST13, the three-dimensional position information about a reflection point is calculated by the frequency analysis unit 49. According to the embodiment including the movable body extraction unit 48, the reflection point is on a movable body.

In step ST14, the physique of the movable body is estimated by the physique estimation unit 61. The details of the process in step ST14 will be explained by referring to FIG. 6. In step ST141, the temporary movable body occupancy probability $p(m_{xyz}|z_n)$ in the current measurement cycle is calculated by the occupancy probability calculation unit 611.

In step ST142, a weighted average of the movable body occupancy probability $p(m_{xyz}|z_{1:n-1})$ in the measurement cycles containing up to the immediately preceding measurement cycle and the temporary movable body occupancy probability $p(m_{xyz}|z_n)$ in the current measurement cycle is acquired as the movable body occupancy probability $p(m_{xyz}|z_{1:n})$ in the measurement cycles containing up to the current measurement cycle by the occupancy probability update unit 612.

In step ST143, the movable body occupancy probability $p(m_{xyz}|z_{1:n})$ in the measurement cycles containing up to the current measurement cycle is held at each cell by the occupancy grid map generation unit 613, and an occupancy grid map is generated by the occupancy grid map generation unit 613. The physique of the movable body can be estimated from the spatial extent of the cells having the movable body occupancy probability $p(m_{xyz}|z_{1:n})$ greater than or equal to the predetermined threshold E. The processing of FIG. 5 is ended when the power supply of the physique estimation device 1 is switched off in conjunction with, for example, the ignition of the vehicle being switched off.

Here, an example of the generation of an occupancy grid map will be explained by referring to FIGS. 7A and 7B. FIG.

7A is a view showing a space INT in the vehicle when viewed from the front of the vehicle. It is assumed that the sensor 10 of the physique estimation device 1 is placed at a position on a line where a surface between the front and rear seats of the vehicle intersects with a surface between a rear seat RS1 and a rear seat RS2, on the ceiling of the vehicle, in such a way that an electric wave is emitted into the vehicle cabin. This placement is only an example, and the physique estimation device 1 may be placed at another position, e.g., at a position near a rear mirror or a position on the ceiling above the rear seats. In the space INT, a person P1 is sitting in the rear seat RS1, and a person P2 is sitting in the rear seat RS2. A piece of baggage L is placed between the sensor 10 and the person P2. It shows a situation in which the person P2 is, for example, a short child or infant, and the person P2 is hidden behind the baggage L when viewed from the sensor 10.

In this situation, the person P1 is detected as a movable body by the above-mentioned physique estimation device 1 having the movable body extraction unit 48, and the occupancy probabilities of the cells corresponding to the space in which the person P1 is present are 1. The baggage L is not detected as a movable body because the baggage L is a static object, and neither the person P2 is detected as a movable body because the person P2 is hidden behind the baggage L. Therefore, the movable body occupancy probability of each cell in the space where the baggage is present, and the movable body occupancy probability of each cell in the space which is behind the baggage when viewed from the sensor 10 are determined as 0. Therefore, an occupancy grid map as shown in FIG. 7B is generated. FIG. 7B shows an example in which imaging is performed on the basis of the movable body occupancy probability held in each cell. In FIG. 7B, the black cells show that a movable body is present, and the white cells show that no movable body is present.

<Variant 1>

Figure 7A:
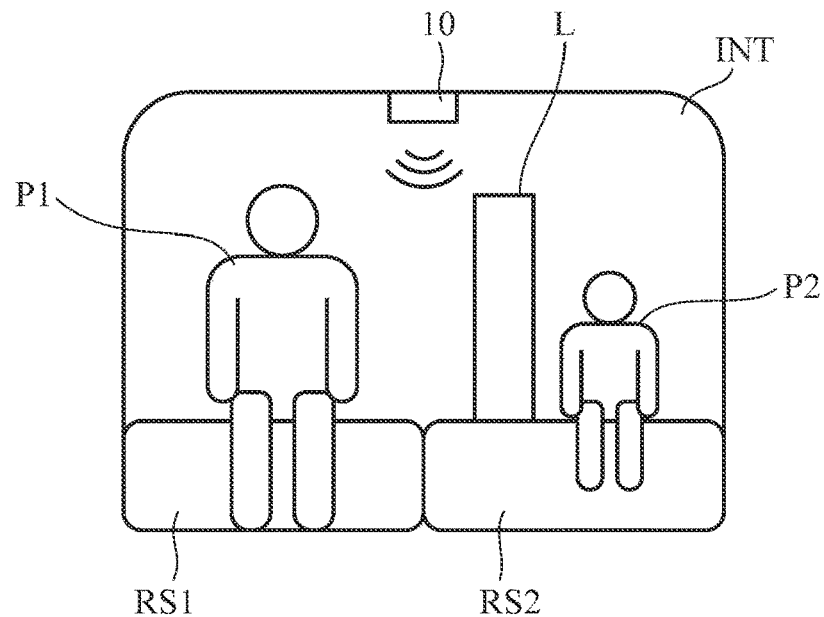
FIG. 7A is a view showing an example of the use of the physique estimation device.
Figure 7B:
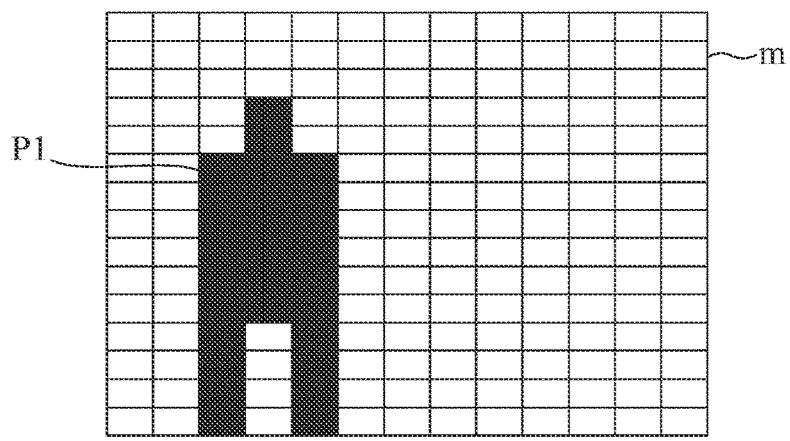
FIG. 7B is a view showing an example of an imaged occupancy grid map.
Figure 8:
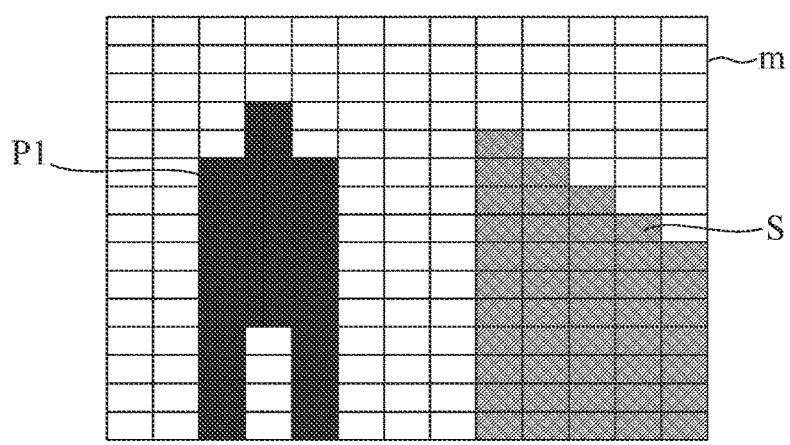
FIG. 8 is a view showing an example of the imaged occupancy grid map.

In the embodiment as explained above in which the signal processing unit 47 includes the movable body extraction unit 48, the generated occupancy grid map is as shown in FIG. 7B, and the person P2 is not detected. However, the reason that the person P2 is not detected is that it is not because the person P2 is not present, but it is because the person P2 is located in a blind spot because of the presence of the baggage L. In a case where a blind spot occurs in this way, it may be more preferable to determine that whether a movable body is present is unknown, rather than to determine that no movable body is present at the position where the blind spot has occurred. More specifically, it may be preferable that an occupancy grid map as shown in FIG. 8 is generated. In FIG. 8, black cells show that a movable body is present, white cells show that no movable body is present, and gray cells show that whether a movable body is present is unknown. Then, a variant capable of determining that whether a movable body is present is unknown will be explained.

<Configuration>

A physique estimation device 1A according to Variant 1 differs from that of Embodiment 1 in that a signal processing unit 47 does not include a movable body extraction unit 48. As a result, in position information supplied from a frequency analysis unit 49 to a physique estimation unit is contained position information about a reflection point on a static object in addition to position information about a reflection point on a movable body. Further, Variant 1 differs from Embodiment 1 in that, in Variant 1, the frequency analysis unit 49 also supplies polar coordinate data (R, θ, φ) and a Doppler frequency $f_d$ to the physique estimation unit.

The other components of Variant 1 are the same as those of Embodiment 1. A repetitive explanation of the same components will be omitted hereinafter.

Figure 9:
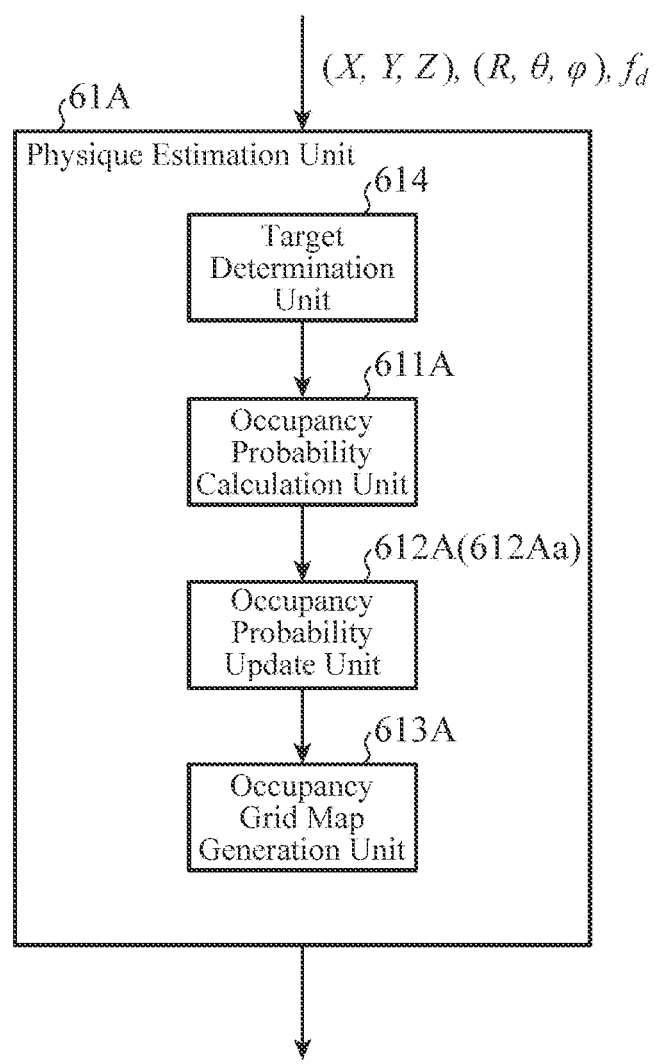
FIG. 9 is a block diagram showing the configuration of a physique estimation unit according to Variant 1.

As shown in FIG. 9, the physique estimation unit 61A of the physique estimation device 1A according to Variant 1 includes a target determination unit 614, an occupancy probability calculation unit 611A, an occupancy probability update unit 612A, and an occupancy grid map generation unit 613A. The physique estimation unit 61A acquires the position information about reflection points from the frequency analysis unit 49. Because the signal processing unit 47 of the physique estimation device 1A does not include a movable body extraction unit 48, in this position information is contained the position information about a reflection point on a static object in addition to the position information about a reflection point on a movable body. Further, the physique estimation unit 61A also acquires the polar coordinate data (R, θ, φ) in addition to the rectangular coordinate data (X, Y, Z). Further, the physique estimation unit 61A also acquires the Doppler frequency $f_d$ of reflection point.

From the Doppler frequency $f_d$ of reflection point, the target determination unit 614 determines whether the target present at the reflection point is a movable body or a static object. The target determination unit 614 supplies a result of the determination to the occupancy probability calculation unit 611A.

The occupancy probability calculation unit 611A calculates the temporary movable body occupancy probability $p(m_{xyz}|Z_n)$ of each cell using Equation (7), and the occupancy probability update unit 612A determines the final movable body occupancy probability $p(m_{xyz}|Z_{1:n})$ of each cell through an update, using Equations (8) and (9).

When the movable body occupancy probability of a specific cell $m_{xyz}$ after the acquisition of a set of K detected values $Z_n=\{z^1_n, z^2_n, \ldots, z^K_n\}$ in the n-th cycle is expressed as $p(m_{xyz}|Z_{1:n})$, $p(m_{xyz}|z_{1:n})$ is derived indirectly from the following Equations (7) and (8). As shown in Equation (7), a general expression of the temporary movable body occupancy probability $p(m_{xyz}|Z_n)$ is provided as the product of K three-dimensional Gaussian mixture distributions about each detection point. When it is determined that the target at a certain detection point is a movable body, the three-dimensional Gaussian mixture distribution about the detection point is expressed as a three-dimensional Gaussian mixture distribution having a peak at the position of the movable body and a peak at the position of a sensor. When it is determined that the target at a certain detection point is a static body, the three-dimensional Gaussian mixture distribution about the detection point is expressed as a three-dimensional Gaussian mixture distribution having a peak at the position of the sensor. More specifically, when a static object is detected, the three-dimensional Gaussian mixture distribution in the general expression is a typical three-dimensional Gaussian distribution. Equation (7) is an update equation based on the Bayesian estimation of an occupancy probability. In consideration of newly acquired data in a current detection cycle, in addition to the information about the probability in the detection cycles containing up to an immediately preceding detection cycle, new information about the probability in the detection cycles containing up to the current detection cycle is acquired. $\ln(m_{xyz})$ in Equation (8) is the logarithm of the ratio which is acquired by dividing the movable body occupancy probability $p(m_{xyz}|Z_{1:n})$ by the movable body non-occupancy probability $1-p(m_{xyz}|Z_{1:n})$ which is the probability that the event does not occur, as defined by Equation (9). An initial value of the movable body occupancy probability of every cell is set to, for example, 0.5 (i.e., an unknown state).

$$p(m_{xyz}|Z_n) = \prod_{k=1}^{K} p(m_{xyz}|z_n^k) = \prod_{k=1}^{K} 0.5 \cdot \{\delta_k P_{occ}^{(k)}(m_{xyz}) + (1 - P_{emp}^{(k)}(m_{xyz}))\} \quad (7)$$

where $$\begin{cases} P_{occ}^{(k)}(m_{xyz}) \sim N\left(z_n^k = [R_k, \sin\theta, \sin\varphi_k]^T, \sum_{occ}\right) \\ P_{emp}^{(k)}(m_{xyz}) \sim N\left([0, \sin\theta_k, \sin\varphi_k]^T, \sum_{emp}\right) \\ \delta_k : 1 \text{ when the target is a movable body;} \\ \quad 0 \text{ when the target is a static object} \end{cases}$$

$$l_n(m_{xyz}) = l_{n-1}(m_{xyz}) + \log\frac{p(m_{xyz}|Z_n)}{1 - p(m_{xyz}|Z_n)} \quad (8)$$

$$l_n(m_{xyz}) \overset{\Delta}{=} \log\frac{p(m_{xyz}|Z_{1:n})}{1 - p(m_{xyz}|Z_{1:n})} \quad (9)$$

However, in these Equations, $z^k_n = [R_k, \sin\theta_k, \sin\phi_k]^T$ is an expression of the polar coordinates of a detected value vector, $R_k$ is the distance from the sensor to a detected value k, $\theta_k$ is an azimuth angle, and $\phi_k$ is an elevation angle. Further, $N(\alpha, \Sigma)$ denotes a three-dimensional polar coordinate Gaussian distribution with an average p and an error covariance $\Sigma$. $\Sigma occ$ is the error covariance of the occupancy probability in the polar coordinate system, and $\Sigma emp$ is the error covariance of the non-occupancy probability in the polar coordinate system.

As shown in Equation (8), the log odds $l_n(m_{xyz})$ of the movable body occupancy probability which is based on the detected values in the measurement cycles containing up to the current measurement cycle n are calculated as the sum of the log odds $l_{n-1}(m_{xyz})$ of the movable body occupancy probability which is based on the detected values in the measurement cycles containing up to the immediately preceding measurement cycle n−1, and the log odds log{[p(m_{xyz}|Z_n)]/[1−p(m_{xyz}|Z_n)]} of the temporary movable body occupancy probability which is based on the detected value in the current measurement cycle n. From the result of this calculation, the movable body occupancy probability p(m_{xyz}|Z_{1:n}) which is based on the detected values in the measurement cycles containing up to the current measurement cycle n is determined using Equation (9) which is the definitional equation of log odds. More specifically, the definitional equation of Equation (9) can be modified into Equation (10), and the movable body occupancy probability p(m_{xyz}|Z_{1:n}) can be determined using Equation (10).

$$p(m_{xyz}|Z_{1:n}) = 1 - \frac{1}{1 + \exp\{l_n(m_{xyz})\}} \quad (10)$$

When a movable body is detected in this way, the temporary movable body occupancy probability of each cell is set as follows. The temporary movable body occupancy probability of each of one or more cells corresponding to the position of the movable body is set to a value close to 1. The temporary movable body occupancy probability of each cell indicating a position between the position of the movable object and the sensor is set to a value which asymptotically varies to 0 with distance from the position of the movable object toward the sensor because it is conceived that only air is present there. The temporary movable body occupancy probability of each cell indicating a position which is away from the position of the movable object when viewed from the sensor is set to 0.5, because it is conceived that no electric waves are travelling there and that the presence or absence of a movable body is unknown. Here, cells "corresponding to the position of the movable body" refer to a cell at the position of the movable body and a cell within a range having a certain extent from the position of the movable body. Therefore, a "cell corresponding to the position of the movable body" is not contained in "each cell indicating a position which is away from the position of the movable object when viewed from the sensor."

Further, when a static object is detected, the temporary movable body occupancy probability of each of one or more cells corresponding to the position of the static object, and the temporary movable body occupancy probability of each cell indicating a position which is away from the position of the static object when viewed from the sensor are set to 0.5, and the temporary movable body occupancy probability of each cell indicating a position between the position of the static object and the sensor is set to a value which asymptotically varies to 0 with distance from the position of the static object toward the sensor. Cells "corresponding to the position of the static body" refer to a cell at the position of the static body and a cell within a range having a certain extent from the position of the static body, and a "cell corresponding to the position of the static body" is not contained in "each cell indicating a position which is away from the position of the static object when viewed from the sensor."

When multiple movable objects are detected, the product of one or more temporary movable body occupation probabilities which are set when the movable objects are detected is determined for each cell to update it as a new temporary movable body occupancy probability of the cell, and when at least one movable object and at least one static object are detected, the product of one or more temporary movable body occupation probabilities which are set when the movable object is detected and one or more temporary movable body occupation probabilities which are set when the static object is detected is determined for each cell to calculate it as a new temporary movable body occupancy probability of the cell.

Then, as to each cell, the log odds of the movable body occupancy probability in the measurement cycles containing up to the current measurement cycle are calculated as the sum of the log odds of the movable body occupancy probability in the measurement cycles containing up to the immediately preceding measurement cycle, and the log odds of the temporary movable body occupancy probability in the current measurement cycle, and the movable body occupancy probability in the measurement cycles containing up to the current measurement cycle is determined from the calculated log odds of the movable body occupancy probability in the measurement cycles containing up to the current measurement cycle.

An occupancy probability update unit 612Aa may be disposed instead of the occupancy probability update unit 612A, and the occupancy probability update unit 612Aa may perform an update of the occupancy probability by calculating a weighted average using the following (11) similar to Equation (6). In this case, Equation (8) is not used.

$$p(m_{xyz}|Z_{1:n}) = \min\{(1-w) \cdot p(m_{xyz}|Z_{1:n-1}) + w \cdot p(m_{xyz}|Z_n), 1\} \quad (11)$$

As mentioned above, as to the movable body occupancy probability of each cell, a weighted average of the movable body occupancy probability in the measurement cycles containing up to the immediately preceding measurement cycle and the temporary movable body occupancy probability in the current measurement cycle may be determined as the movable body occupancy probability in the measurement cycles containing up to the current measurement cycle.

As a result of assigning the movable body occupancy probability in the measurement cycles containing up to the current measurement cycle to each cell as the movable body occupancy probability, an occupancy grid map is generated.

<Operation>

Figure 10:
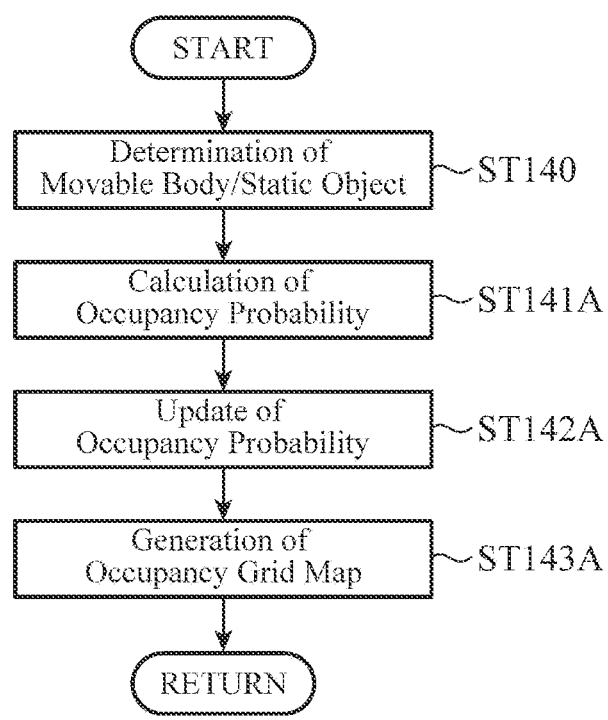
FIG. 10 is a detailed flowchart of physique estimation processing according to Variant 1.

Next, the operation of the physique estimation device 1A according to Variant 1 will be explained by referring to FIG. 10. In the physique estimation device 1A, the details of an operation in step ST14 which is associated with physique estimation differs from that in the case of Embodiment 1. Then, this different operation will be explained.

In step ST140, the target determination unit 614 determines whether a target present at a reflection point is a movable body or a static object from the Doppler frequency $f_d$ of the reflection point.

In step ST141A, the occupancy probability calculation unit 611A calculates the temporary movable body occupancy probability $p(m_{xyz}|Z_n)$ in the current measurement cycle.

In step ST142A, the occupancy probability update unit 612A determines the sum of the log odds $l_{n-1}(m_{xyz})$ of the movable body occupancy probability in the measurement cycles containing up to the immediately preceding measurement cycle, and the log odds $\log\{[p(m_{xyz}|Z_n)]/[1-p(m_{xyz}|Z_n)]\}$ of the temporary movable body occupancy probability in the current measurement cycle, and determines it as the log odds $l_n(m_{xyz})$ of the movable body occupancy probability in the measurement cycles containing up to the current measurement cycle. The movable body occupancy probability $p(m_{xyz}|Z_{1:n})$ in the measurement cycles containing up to the current measurement cycle is updated from the log odds $l_n(m_{xyz})$ of the movable body occupancy probability in the measurement cycles containing up to the current measurement cycle. The update of the occupancy probability may be performed by the occupancy probability update unit 612Aa by calculating a weighted average in accordance with Equation (11).

In step ST143A, the occupancy grid map generation unit 613A causes each cell to hold the movable body occupancy probability $p(m_{xyz}|Z_{1:n})$ in the measurement cycles containing up to the current measurement cycle, and generates an occupancy grid map. The physique of the movable body can be estimated from the spatial extent of the cells each having a movable body occupancy probability $p(m_{xyz}|z_{1:n})$ greater than or equal to a predetermined threshold E.

An occupancy grid map (FIG. 8) which is as mentioned in the beginning of Variant 1 is generated by the above-mentioned physique estimation device 1A in the same situation as that shown in FIG. 7A. In the occupancy grid map of FIG. 8, gray cells show that whether a movable body is present is unknown as for a piece of baggage L, which is a static object, and for space S which is hidden behind the piece of baggage L. More specifically, the space in the vehicle cabin where the presence of a movable body is unknown is specified. Therefore, it is possible to prevent display showing that no movable body is present although a movable body is present from being provided.

<Variant 2>

In the case of detecting a target having such a size as that of a person using a laser light beam, because the laser light beam has high directivity, the laser light beam hardly goes around behind the target, so that any other object is not detected. In contrast with this, in the case of detecting a target having such a size as that of a person using an electromagnetic wave having a frequency lower than those of laser light beams, such as a radio wave, there is a case in which the radio wave goes around behind the target. Therefore, there is a case in which a movable body B present behind a movable body A is detected. In such a case, in the physique estimation device 1A according to above-mentioned Variant 1, because the temporary movable body occupancy probability is set to a value which asymptotically varies to 0 with distance from the position of the movable object B toward the sensor in accordance with Equation (6), the final movable body occupancy probability of each cell corresponding to the detected movable body A drops. However, since the movable body A is detected, it may be preferable to prevent the movable body occupancy probability of each cell corresponding to the movable body A from dropping. Then, an embodiment according to Variant 2 of, when a movable body A and a movable body B present behind the movable body A are detected, preventing the movable body occupancy probability of the movable body A from dropping will be explained. In Variant 2, the Dempster-Shafer theory of evidence is used.

A physique estimation device 1B according to Variant 2 differs from that of Embodiment 1 in that a signal processing unit 47 does not include a movable body extraction unit 48. As a result, in position information supplied from a frequency analysis unit 49 to a physique estimation unit is contained position information about a reflection point on a static object in addition to position information about a reflection point on a movable body. Further, Variant 2 differs from Embodiment 1 in that in Variant 2 the frequency analysis unit 49 also supplies polar coordinate data (R, θ, φ) and a Doppler frequency $f_d$ to the physique estimation unit. The other components of Variant 2 are the same as those of Embodiment 1. A repetitive explanation of the same components will be omitted hereinafter.

Figure 11:
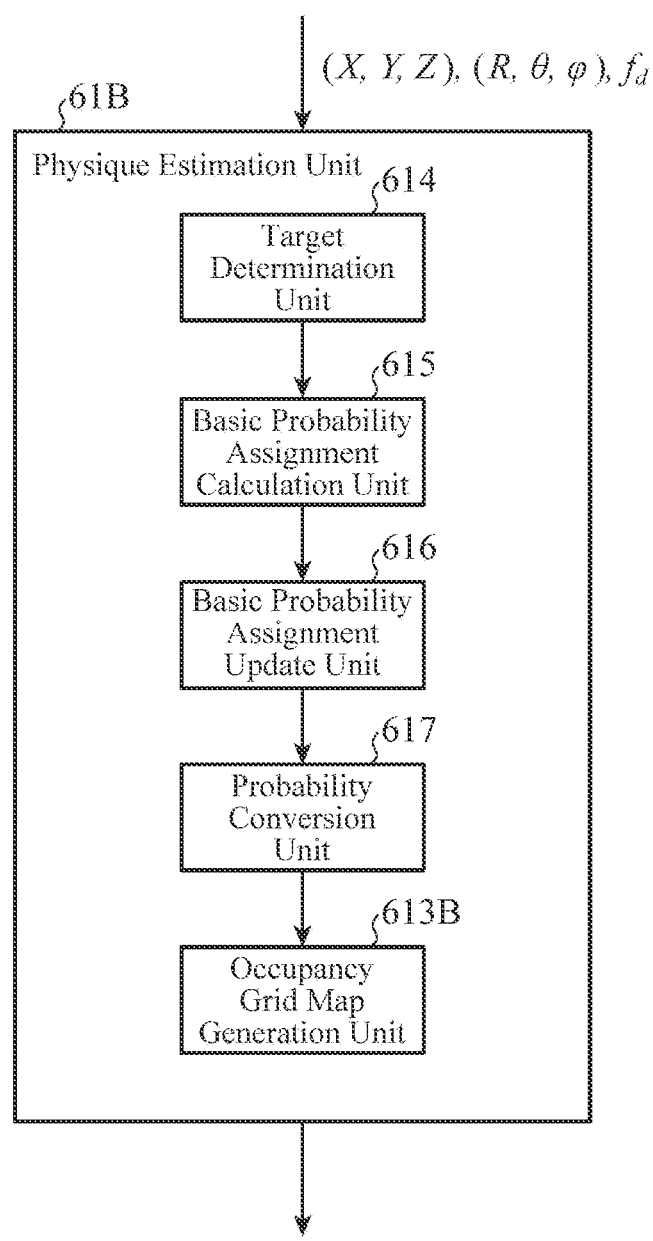
FIG. 11 is a block diagram showing the configuration of a physique estimation unit according to Variant 2.

As shown in FIG. 11, the physique estimation unit 61B includes a target determination unit 614, a basic probability assignment calculation unit 615, a basic probability assignment update unit 616, a probability transformation unit 617, and an occupancy grid map generation unit 613B.

From the Doppler frequency $f_d$ of a reflection point, the target determination unit 614 determines whether the target present at the reflection point is a movable body or a static object. The target determination unit 614 supplies a result of the determination to an occupancy probability calculation unit 611A.

The basic probability assignment calculation unit 615 calculates, as to each cell, a temporary movable body occupancy basic probability assignment, a temporary movable body non-occupancy basic probability assignment, and a temporary unknown basic probability assignment using the Dempster-Shafer theory of evidence. The basic probability assignment update unit 616 combines the three basic probability assignments of each cell (the movable body occupancy basic probability assignment, the movable body non-occupancy basic probability assignment, and the unknown basic probability assignment) in an immediately preceding measurement cycle, and the temporary movable body occupancy basic probability assignment, the temporary movable body non-occupancy basic probability assignment, and the temporary unknown basic probability assignment in a current measurement cycle for each cell using the Dempster-Shafer theory of evidence, to finally calculate the three basic probability assignments of each cell in the current measurement cycle.

Here, the Dempster-Shafer theory of evidence is explained. Consider an universal set Θ={E, O} which consists of two elements. E refers to a non-occupancy state, and O refers to an occupancy state. The power set of the universal set θ is X={Φ, E, O, Θ}. Φ refers to an empty set, and Θ refers to a state showing that whether the state is E or O is unknown. According to the Dempster-Shafer theory of evidence, the basic probability assignment which is a function corresponding to a probability distribution in the probability theory is defined for the power set X as given by the following Equation (12).

$$m(X) = \begin{cases} p_O & (\text{if } X = O) \\ p_E & (\text{if } X = E) \\ p_\Theta & (\text{if } X = \Theta) \\ 0 & (\text{if } X = \phi) \end{cases} \text{ (where } p_O + p_E + p_\Theta = 1\text{)} \quad (12)$$

Next, according to the Dempster-Shafer theory of evidence, an operation to combine multiple basic probability assignments is defined as given by the following Equation (13).

$$m_{12}(X) = (m_1 \oplus m_2)(X) = \begin{cases} \frac{(m_1 \cap m_2)(X)}{1 - (m_1 \cap m_2)(\phi)} & (\text{if } X \neq \phi) \\ 0 & (\text{if } X = \phi) \end{cases} \quad (13)$$

where $$(m_1 \cap m_2)(X) = \sum_{A,B \in 2^\Theta | A \cap B = X} m_1(A) m_2(B)$$

Finally, the basic probability assignment m(X) is transformed into a probability value p(X) in the probability theory in accordance with Equation (14).

$$\begin{cases} p(O) = m(O) + 0.5 \cdot m(\Theta) \\ p(E) = m(E) + 0.5 \cdot m(\Theta) \end{cases} \quad (14)$$

It is assumed that a set of K detected values $Z_n = \{z^1_n, z^2_n, \ldots, z^K_n\}$ is acquired in the n-th measurement cycle on the basis of the above-mentioned Dempster-Shafer theory of evidence. It is assumed that the M values which are counted from the first one of the K detected values correspond to a movable body, and the remaining values correspond to a static object. When the movable body occupancy probability of a specific cell $m_{xyz}$ in the n-th cycle is expressed as $p(m_{xyz}|Z_{1:n})$, $p(m_{xyz}|Z_{1:n})$ is directly derived from the following Equations (15) and (16). Equation (15) uses the expression to combine basic probability assignments according to Dempster-Shafer. Equation (16) is a transformation to transform the basic probability assignment m(X) into the probability value p(X).

$$m_n(X | m_{xyz}) = (m_{n-1} \oplus m^1_{occ} \oplus \ldots \oplus m^M_{occ} \oplus m^1_{emp} \oplus \ldots \oplus m^K_{emp})(X | m_{xyz}) \quad (15)$$

where $$\begin{cases} m^k_{occ}(X | m_{xyz}) = \begin{cases} P^{(k)}_{occ}(m_{xyz}) & (\text{if } X = O) \\ 1 - P^{(k)}_{occ}(m_{xyz}) & (\text{if } X = \Theta) \\ 0 & (\text{others}) \end{cases} \\ m^k_{emp}(X | m_{xyz}) = \begin{cases} P^{(k)}_{emo}(m_{xyz}) & (\text{if } X = E) \\ 1 - P^{(k)}_{emp}(m_{xyz}) & (\text{if } X = \Theta) \\ 0 & (\text{others}) \end{cases} \\ P^{(k)}_{occ}(m_{xyz}) \sim N\left(z^k_n = [R_k, \sin\theta_k, \sin\phi_k]^T, \sum_{occ}\right) \\ P^{(k)}_{emp}(m_{xyz}) \sim N\left([0, \sin\theta_k, \sin\phi_k]^T \sum_{emp}\right) \end{cases}$$

$$p(m_{xyz} | Z_{1:n}) = m_n(O | m_{xyz}) + 0.5 \cdot m_n(\Theta | m_{xyz}) \quad (16)$$

However, in these Equations, $z^k_n = [R_k, \sin\theta_k, \sin\phi_k]^T$ is an expression of the polar coordinates of a detected value vector, $R_k$ is the distance from a sensor to a detected value k, $\theta_k$ is an azimuth angle, and $\phi_k$ is an elevation angle. Further, N(α, Σ) denotes a three-dimensional polar coordinate Gaussian distribution with an average μ and an error covariance Σ. Σocc is the error covariance of the occupancy probability in the polar coordinate system, and Σemp is the error covariance of the non-occupancy probability in the polar coordinate system. The movable body occupancy probability $P_{occ}^{(k)}(m_{xyz})$, and the non-occupancy probability $P_{emp}^{(k)}(m_{xyz})$ are updated through separate computations, unlike the case of Variant 1 specified using a single mixed Gaussian distribution.

The basic probability assignment calculation unit 615 calculates, as to each cell, the temporary movable body occupancy basic probability assignment, the temporary movable body non-occupancy basic probability assignment, and the temporary unknown basic probability assignment in accordance with Equation (15). More specifically, when a movable body is detected, the basic probability assignment calculation unit 615 sets the temporary movable body occupancy basic probability assignment of one or more cells corresponding to the position of the movable body in such a way that the temporary movable body occupancy basic probability assignment is close to 1, and sets the temporary movable body occupancy basic probability assignment of any cell other than the one or more cells corresponding to the position of the movable body in such a way that the temporary movable body occupancy basic probability assignment asymptotically varies to 0 with distance from the position of the movable body ($m_{occ}^k(X|m_{xyz}) = P_{occ}^{(k)}(m_{xyz})$), and, as to every cell, sets its temporary unknown basic probability assignment to a value which is obtained by subtracting the temporary movable body occupancy basic probability assignment of the cell from 1 ($m_{occ}^k(X|m_{xyz}) = 1 - P_{occ}^{(k)}(m_{xyz})$) Further, when a static object is detected, the basic probability assignment calculation unit 615 sets the temporary movable body non-occupancy basic probability assignment of one or more cells corresponding to the position of the sensor in such a way that the temporary movable body non-occupancy basic probability assignment is close to 1, and sets the temporary movable body non-occupancy basic probability assignment of any cell other than the one or more cells corresponding to the position of the sensor in such a way that the temporary movable body non-occupancy basic probability assignment asymptotically varies to 0 with distance from the position of the sensor toward the position of the static object ($m_{emp}^k(X|m_{xyz}) = P_{emp}^{(k)}(m_{xyz})$), and, as to every cell, sets its temporary unknown basic probability assignment to a value which is obtained by subtracting the temporary movable body non-occupancy basic probability assignment of the cell from 1 ($m_{emp}^{k}(X|m_{xyz})=1-P_{emp}^{(k)}(m_{xyz})$). When multiple targets contain either multiple movable bodies or at least one movable body and at least one static object, the basic probability assignment calculation unit 615 combines the temporary movable body occupancy basic probability assignment or the temporary movable body non-occupancy basic probability assignment, and the temporary unknown basic probability assignment which are associated with each target for each cell, to calculate a new temporary movable body occupancy basic probability assignment, a new temporary movable body non-occupancy basic probability assignment, and a new temporary unknown basic probability assignment of each cell.

In accordance with Equation (15), the basic probability assignment update unit 616 combines the basic probability assignment $m_{n-1}(X|m_{xyz})$ of each cell in measurement cycles containing up to an immediately preceding measurement cycle, and the temporary basic probability assignments in a current measurement cycle (the movable body occupancy basic probability assignment, the temporary movable body non-occupancy basic probability assignment, and the temporary unknown basic probability assignment) for each cell, to finally calculate the three basic probability assignments of each cell in the current measurement cycle.

In accordance with Equation (16), the probability transformation unit 617 transforms the three final basic probability assignments of each cell in the current measurement cycle into the movable body occupancy probability $p(m_{xyz}|Z_{1:n})$ of each cell in the measurement cycles containing up to the current measurement cycle.

The occupancy grid map generation unit 613B causes each cell to hold the determined movable body occupancy probability $p(m_{xyz}|Z_{1:n})$. As a result, an occupancy grid map showing the probability that the movable body is present in each cell of space m is generated.

<Operation>

Figure 12:
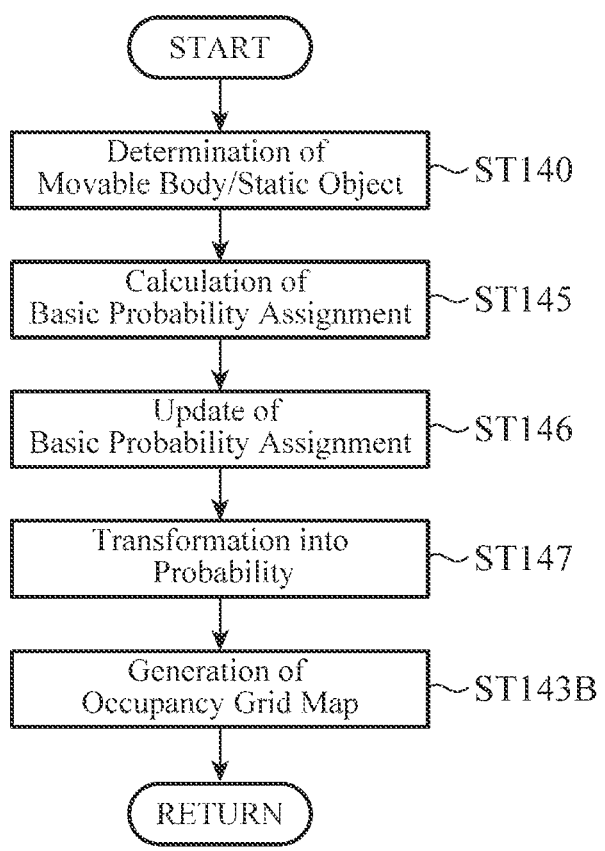
FIG. 12 is a detailed flowchart of physique estimation processing according to Variant 2.

Next, the operation of the physique estimation device 1B according to Variant 2 will be explained by referring to FIG. 12. In the physique estimation device 1B, the details of an operation in step ST14 which is associated with physique estimation differs from that in the case of Embodiment 1. Then, this different operation will be explained.

In step ST140, the target determination unit 614 determines whether a target present at a reflection point is a movable body or a static object from the Doppler frequency $f_d$ of the reflection point, like in the case of Variant 1.

In step ST145, the basic probability assignment calculation unit 615 calculates the temporary basic probability assignments in the current measurement cycle (the movable body occupancy basic probability assignment, the temporary movable body non-occupancy basic probability assignment, and the temporary unknown basic probability assignment).

In step ST146, the basic probability assignment update unit 616 combines the basic probability assignment $m_{n-1}(X|m_{xyz})$ of each cell in the measurement cycles containing up to the immediately preceding measurement cycle, and the temporary basic probability assignments in the current measurement cycle (the movable body occupancy basic probability assignment, the temporary movable body non-occupancy basic probability assignment, and the temporary unknown basic probability assignment) for each cell, to update them as the three basic probability assignments of each cell in the current measurement cycle.

In step ST147, the probability transformation unit 617 transforms the three final basic probability assignments of each cell in the current measurement cycle into the movable body occupancy probability $p(m_{xyz}|Z_{1:n})$ of each cell in the measurement cycles containing up to the current measurement cycle.

In step ST143B, the occupancy grid map generation unit 613B causes each cell to hold the movable body occupancy probability $p(m_{xyz}|Z_{1:n})$ in the measurement cycles containing up to the current measurement cycle, and generates an occupancy grid map. The physique of the movable body can be estimated from the spatial extent of the cells each having a movable body occupancy probability $p(m_{xyz}|Z_{1:n})$ greater than or equal to a predetermined threshold E.

Figure 13A:
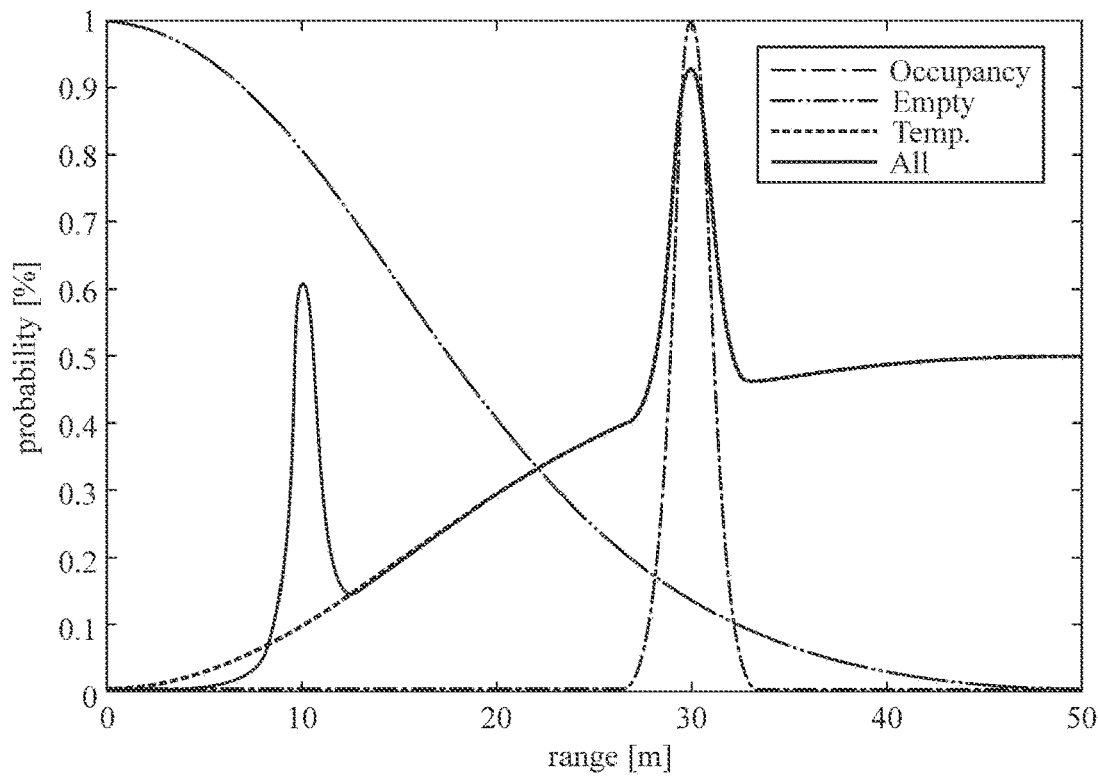
FIG. 13A is a graph showing a result of a simulation of the operation of a physique estimation device according to Variant 1.
Figure 13B:
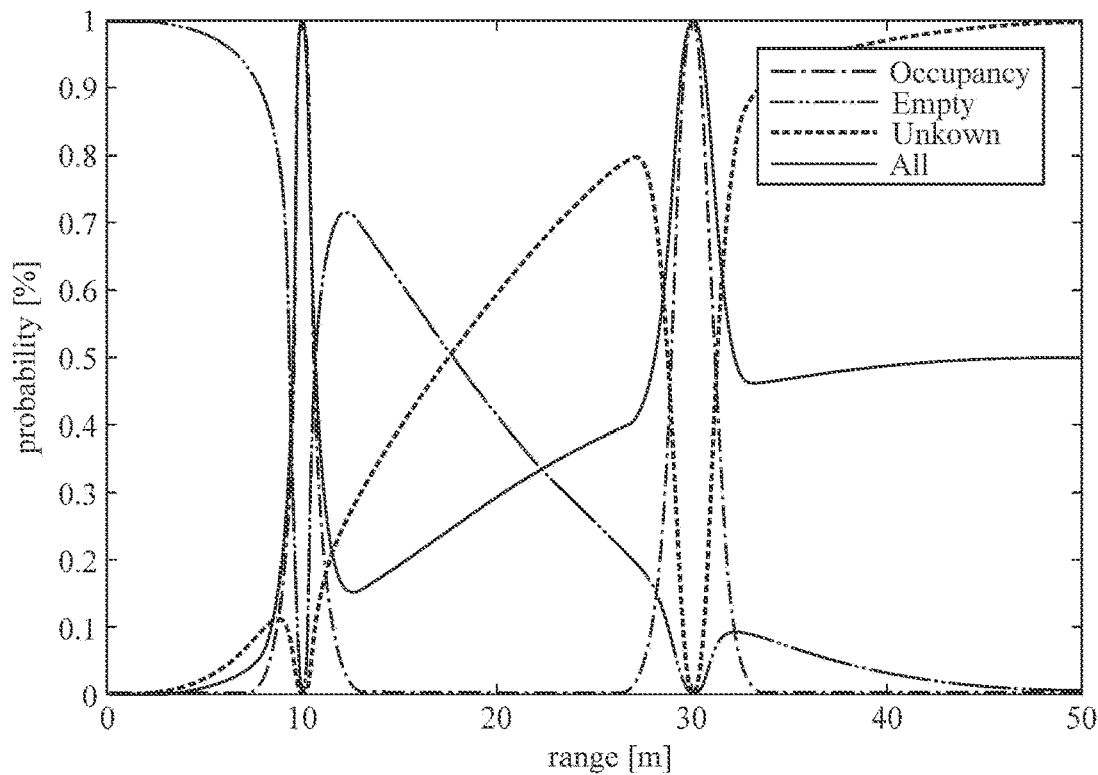
FIG. 13B is a graph showing a result of a simulation of the operation of a physique estimation device according to Variant 2.

Hereinafter, advantageous points of Variant 2 will be explained by referring to FIGS. 13A and 13B. Both of FIGS. 13A and 13B are graphs showing results of performing a simulation to determine whatever movable body occupancy probability distribution is formed when a movable body A is detected at a point at a distance of 10 meters from the sensor and a movable body B is detected at a point at a distance of 30 meters from the sensor. For the sake of simplicity, the simulation is performed in one-dimensional space. FIG. 13A shows the simulation result in the case of Variant 1, and FIG. 13B shows the simulation result in the case of Variant 2.

In FIG. 13A, Occupancy denotes the distribution of movable body occupancy probabilities when the movable body B is detected, Empty denotes the distribution of movable body non-occupancy probabilities when the movable body B is detected, Temp. denotes the superposition of the distribution of movable body occupancy probabilities and the distribution of movable body non-occupancy probabilities, and All denotes the sum total of the distribution of movable body occupancy probabilities when the movable body A is detected and the distribution of movable body occupancy probabilities when the movable body B is detected.

On the other hand, in FIG. 13B, Occupancy denotes the distribution of movable body occupancy basic probability assignments, Empty denotes the distribution of movable body non-occupancy basic probability assignments, Unknown denotes the distribution of unknown basic probability assignments, and All denotes the distribution of movable body occupancy probabilities calculated from these basic probability assignments.

As can be seen from a comparison between FIG. 13A and FIG. 13B, the movable body occupancy probability at the 10-m point is lower than that at the 30-m point in the case of FIG. 13A. This is because the detection of the movable body B is assumed to cause a reduction in the movable body presence probabilities between the sensor and the movable body B. In contrast with this, the movable body occupancy probability at the 10-m point is the same as that at the 30-m point in the case of FIG. 13B. This is because m(Θ) which is another variable is explicitly prepared and calculated for a state in which whether a movable body is present is unknown, separately from that for the occupancy state or the non-occupancy state.

As mentioned above, in the physique estimation device 1B of Variant 2, when a radio wave is diffracted and multiple movable bodies are detected, the movable body occupancy probability of one movable body is not affected by the detection of any other movable body. Therefore, the physique estimation device 1B can estimate the physique of a movable body more properly.

Because the physique estimation devices 1, 1A, and 1B configured in the above-mentioned way eliminate the necessity to process the seats of vehicles for detecting the physique of an occupant, unlike in the case of conventional technologies such as the one disclosed in Patent Literature 1, the merit of being able to reduce the introduction cost of the device is provided.

Embodiment 2

Figure 14:
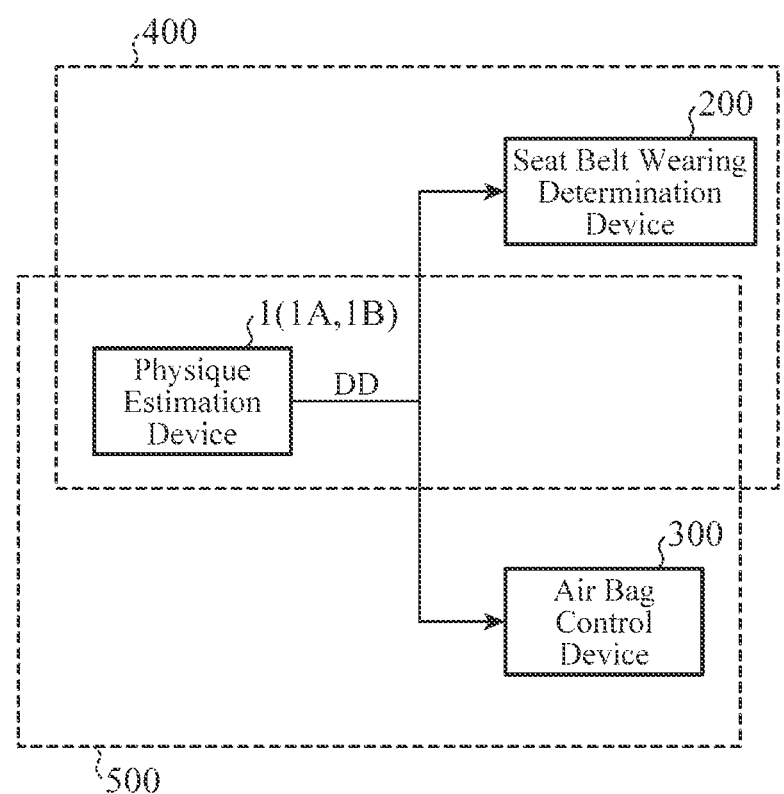
FIG. 14 is a block diagram showing the configuration of a seatbelt reminder system and an airbag control system.

Next, a seatbelt reminder system and an airbag control system will be explained by referring to FIGS. 14, 15, and 16. FIG. 14 is a block diagram showing the configuration of the seatbelt reminder system and the airbag control system according to Embodiment 2. As shown in FIG. 14, a physique estimation device 1 (1A, 1B) outputs a physique estimation result DD to either a seat belt wearing determination device 200 or an air bag control device 300, or both of them, by way of a not-illustrated output control unit of the physique estimation device 1 (1A, 1B). A seatbelt reminder system 400 which includes the physique estimation device 1 (1A, 1B) and the seat belt wearing determination device 200 is configured by the output of the physique estimation result DD to the seat belt wearing determination device 200. An airbag control system 500 which includes the physique estimation device 1 (1A, 1B) and the air bag control device 300 is configured by the output of the physique estimation result DD to the air bag control device 300.

Figure 15:
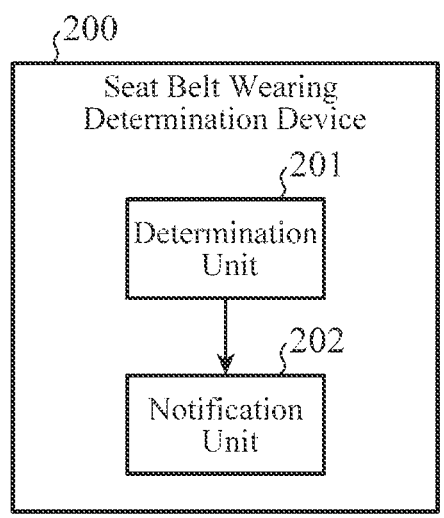
FIG. 15 is a block diagram showing the configuration of a seat belt wearing determination device.

As shown in FIG. 15, the seat belt wearing determination device 200 includes a determination unit 201 and a notification unit 202. The determination unit 201 determines whether or not the seat belt corresponding to the position of a movable body whose physique is estimated is worn, on the basis of the physique estimation result DD, and outputs a result of the determination to the notification unit 202. In a certain case, the notification unit 202 provides, by sound or display, an alert showing that the seat belt is not worn on the basis of the determination result. As an example, when the movable body is estimated to have a physique greater than or equal to a predetermined size, and it is then determined that the seat belt corresponding to the position of the movable body whose physique is estimated is not worn, a notification that the seat belt is not worn is provided.

As another example, when the movable body is estimated to have a physique less than the predetermined size, a notification that the seat belt is not worn is not provided. There is a case in which a seat for infants or children (hereinafter, a seat for infants and a seat for children are generically and simply referred to as a "child seat") is placed in a seat of a vehicle, and an infant or child sits in the child seat. In such a situation, even when a movable body is detected, it is not appropriate to provide a notification that the seat belt of the vehicle is not worn. This is because it is expected that the seat belt of a child seat is worn by an infant or child, while it is not expected that the seat belt of the vehicle is worn. Further, there is a case in which an occupant below a certain height is not legally obliged to wear a seat belt, regardless of whether or not a child seat is mounted. Also in this case, the device can be made to comply with the legal regulation by, when a movable body is estimated to have a physique less than a size corresponding to such a height, not providing a notification that the seat belt is not worn.

The predetermined size may be determined using either the number of cells in each of which the movable body presence probability is greater than or equal to a predetermined threshold or the shape of the edge of cells in each of which the movable body presence probability is greater than or equal to a predetermined threshold and the shape of the edge of cells in each of which the movable body presence probability is less than the threshold.

Figure 16:
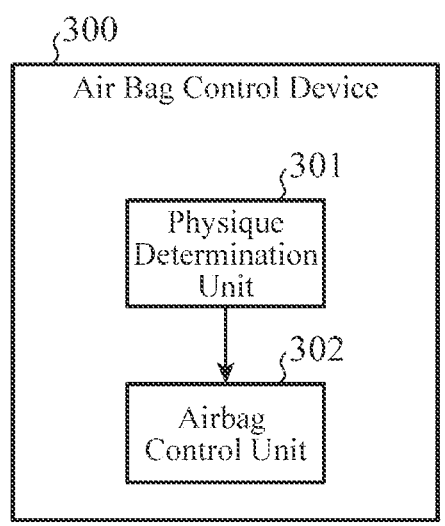
FIG. 16 is a block diagram showing the configuration of an air bag control device.

As shown in FIG. 16, the air bag control device 300 includes a physique determination unit 301 and an airbag control unit 302. The physique determination unit 301 determines the size of the physique on the basis of the physique estimation result DD, and outputs a result of the determination to the airbag control unit 302. On the basis of the determination result, the airbag control unit 302 controls the operation of the airbag corresponding to the position of a movable body whose physique is estimated. For example, the airbag control unit 302 changes the pressure (unfolding expansion force) when the airbag is activated in accordance with the occupant's physique. As an example, the pressure is set to a relatively high one when a physique is estimated to be greater than or equal to a predetermined size, whereas the pressure is set to a relatively low one when a physique is estimated to be less than the predetermined size. By performing such control, the possibility that infants and children with inadequate physical growth get injured because of unfolding of the airbag can be reduced.

Both the seat belt wearing determination device 200 and the air bag control device 300 can be implemented by the same hardware configuration as that of FIG. 4A or 4B.

ADDITIONAL REMARKS

Some aspects of the various embodiments explained above will be summarized hereinafter.

Additional Remark 1

A physique estimation device (1, 1A, 1B) of Additional Remark 1 includes: a sensor (10) having a transmission antenna to transmit a transmission wave, and a reception antenna to receive the transmission wave reflected by at least one target in a vehicle cabin as a received wave;
  a frequency analysis unit (49) to acquire position information about a reflection point where the transmission wave is reflected using the received wave; and
  a physique estimation unit (61) to estimate the physique of a non-static object present in the vehicle cabin using the position information.

Additional Remark 2

A physique estimation device of Additional Remark 2 is the physique estimation device described in Additional Remark 1, and
  the physique estimation unit determines space where the presence of a non-static object in the vehicle cabin is unknown.

Additional Remark 3

A physique estimation device of Additional Remark 3 is the physique estimation device described in Additional Remark 1 or 2, and
  the transmission wave includes multiple chirps whose frequencies rise or fall,
  the sensor further has a mixer to mix the transmission wave and the received wave, to generate beat signals,
  the position information is acquired through an analysis of the beat signals, and
  the physique estimation unit determines a movable body occupancy probability showing the probability of presence of a non-static object in each of multiple cells contained in three-dimensional grid space and showing the inside of the vehicle cabin, and estimates the spatial extent of cells whose movable body occupation probabilities are greater than or equal to a threshold as the physique of the non-static object present in the vehicle cabin.

Additional Remark 4

A physique estimation device of Additional Remark 4 is the physique estimation device described in any one of Additional Remarks 1 to 3, and
the frequency analysis unit analyzes the beat signals by performing a range FFT, a Doppler FFT, and an angle FFT on the beat signals.

Additional Remark 5

A physique estimation device (1) of Additional Remark 5 is the physique estimation device described in Additional Remark 3 or 4, and
further includes a movable body extraction unit (48) to perform a movable body extraction process on the beat signals, and extract a non-static object present in the vehicle cabin, and
the physique estimation unit includes:
an occupancy probability calculation unit (611) to set, as to each of the multiple cells, a temporary movable body occupancy probability in a current measurement cycle to 1 when a non-static object is detected, and to set, as to each of the multiple cells, the temporary movable body occupancy probability to 0 when no non-static object is detected;
an occupancy probability update unit (612) to determine, as to each of the cells, a weighted average of the movable body occupancy probability in measurement cycles containing up to an immediately preceding measurement cycle and the temporary movable body occupancy probability in the current measurement cycle as the movable body occupancy probability in measurement cycles containing up to the current measurement cycle; and
an occupancy grid map generation unit (613) to assign the movable body occupancy probability in the measurement cycles containing up to the current measurement cycle to each of the cells as the movable body occupancy probability, and generate an occupancy grid map.

Additional Remark 6

A physique estimation device (1A) of Additional Remark 6 is the physique estimation device described in Additional Remark 3 or 4, wherein the at least one target includes multiple targets and
the physique estimation unit includes:
a target determination unit (614) to determine whether a detected target is a non-static object or a static object;
an occupancy probability calculation unit (611A) to,
when a non-static object is detected in a case where either multiple non-static objects or at least one non-static object and at least one static object are detected as the multiple targets, set a temporary movable body occupancy probability of one or more cells corresponding to the position of the detected non-static object to a value close to 1, set a temporary movable body occupancy probability of each cell at a position between the position of the detected non-static object and the sensor to a value which asymptotically varies to 0 with distance from the position of the detected non-static object toward the sensor, and set a temporary movable body occupancy probability of each cell at a position which is away from the position of the non-static object when viewed from the sensor to 0.5,
when a static object is detected in the above case, set a temporary movable body occupancy probability of each of one or more cells corresponding to the position of the detected static object, and a temporary movable body occupancy probability of each cell which is away from the position of the detected static object when viewed from the sensor to 0.5, and set a temporary movable body occupancy probability of each cell at a position between the position of the detected static object and the sensor to a value which asymptotically varies to 0 with distance from the position of the detected static object toward the sensor,
when multiple non-static objects are detected in the above case, determine the product of one or more temporary movable body occupation probabilities which are set when a non-static object is detected for each of the cells, to update it as a new temporary movable body occupancy probability of the cell, or
when at least one non-static object and at least one static object are detected in the above case, determine the product of one or more temporary movable body occupation probabilities which are set when a non-static object is detected and one or more temporary movable body occupation probabilities which are set when a static object is detected for each of the cells, and to calculate the product as a new temporary movable body occupancy probability of the cell;
an occupancy probability update unit (612Aa) to determine, as to the movable body occupancy probability of each of the cells, a weighted average of the movable body occupancy probability in measurement cycles containing up to an immediately preceding measurement cycle and the temporary movable body occupancy probability in a current measurement cycle as the movable body occupancy probability in measurement cycles containing up to the current measurement cycle; and
an occupancy grid map generation unit (613A) to assign the movable body occupancy probability in the measurement cycles containing up to the current measurement cycle to each of the cells as the movable body occupancy probability, and generate an occupancy grid map.

Additional Remark 7

A physique estimation device (1A) of Additional Remark 7 is the physique estimation device described in Additional Remark 3 or 4, wherein the at least one target includes multiple targets and
the physique estimation unit includes:
a target determination unit (614) to determine whether a detected target is a non-static object or a static object;
an occupancy probability calculation unit (611A) to, when a non-static object is detected in a case where either multiple non-static objects or at least one non-static object and at least one static object are detected as the multiple targets, set a temporary movable body occupancy probability of one or more cells corresponding to the position of the detected non-static object to a value close to 1, set a temporary movable body occupancy probability of each cell at a position between the position of the detected non-static object and the sensor to a value which asymptotically varies to 0 with distance from the position of the detected non-static object toward the sensor, and set a temporary movable body occupancy probability of each cell at a position which is away from the position of the non-static object when viewed from the sensor to 0.5, when a static object is detected in the above case, set a temporary movable body occupancy probability of each of one or more cells corresponding to the position of the detected static object, and a temporary movable body occupancy probability of each cell which is away from the position of the detected static object when viewed from the sensor to 0.5, and set a temporary movable body occupancy probability of each cell at a position between the position of the detected static object and the sensor to a value which asymptotically varies to 0 with distance from the position of the detected static object toward the sensor, when the multiple non-static objects are detected in the above case, determine the product of one or more temporary movable body occupation probabilities which are set when a non-static object is detected for each of the cells, to update it as a new temporary movable body occupancy probability of the cell, or when the at least one non-static object and the at least one static object are detected in the above case, determine the product of one or more temporary movable body occupation probabilities which are set when a non-static object is detected and one or more temporary movable body occupation probabilities which are set when a static object is detected for each of the cells, and calculate the product as a new temporary movable body occupancy probability of the cell;

an occupancy probability update unit (612A) to calculate, as to each of the cells, the log odds of the movable body occupancy probability in measurement cycles containing up to a current measurement cycle, as the sum of the log odds of the temporary movable body occupancy probability in measurement cycles containing up to an immediately preceding measurement cycle and the log odds of the movable body occupancy probability in the current measurement cycle, and to determine the movable body occupancy probability in the measurement cycles containing up to the current measurement cycle from the calculated log odds of the movable body occupancy probability in the measurement cycles containing up to the current measurement cycle; and an occupancy grid map generation unit (613A) to assign the movable body occupancy probability in the measurement cycles containing up to the current measurement cycle, as the movable body occupancy probability, to each of the cells, and generate an occupancy grid map.

Additional Remark 8

A physique estimation device (1B) of Additional Remark 8 is the physique estimation device described in Additional Remark 3 or 4, wherein the at least one target includes multiple targets and the physique estimation unit includes:

a target determination unit (614) to determine whether the detected target is a non-static object or a static object;

a basic probability assignment calculation unit (615) to calculate three basic probability assignments including a movable body occupancy basic probability assignment showing that a non-static object is present, a movable body non-occupancy basic probability assignment showing that no non-static object is present, and an unknown basic probability assignment showing that whether a non-static object is present is unknown in every measurement cycle, to, when a non-static body is detected, set a temporary movable body occupancy basic probability assignment of one or more cells corresponding to the position of the detected non-static body in such a way that the temporary movable body occupancy basic probability assignment is close to 1, and set a temporary movable body occupancy basic probability assignment of any cell other than the one or more cells corresponding to the position of the detected non-static body in such a way that the temporary movable body occupancy basic probability assignment asymptotically varies to 0 with distance from the position of the detected non-static body, and, as to every cell, set a temporary unknown basic probability assignment to a value which is obtained by subtracting a temporary movable body occupancy basic probability assignment of the cell from 1, when a static object is detected, set a temporary movable body non-occupancy basic probability assignment of one or more cells corresponding to the position of the sensor in such a way that the temporary movable body non-occupancy basic probability assignment is close to 1, and set a temporary movable body non-occupancy basic probability assignment of any cell other than the one or more cells corresponding to the position of the sensor in such a way that the temporary movable body non-occupancy basic probability assignment asymptotically varies to 0 with distance from the position of the sensor toward the position of the detected static object, and, as to every cell, set a temporary unknown basic probability assignment to a value which is obtained by subtracting a temporary movable body non-occupancy basic probability assignment of the cell from 1, or when the multiple targets include either multiple non-static bodies or at least one non-static body and at least one static object, combine a temporary movable body occupancy basic probability assignment or a temporary movable body non-occupancy basic probability assignment, and a temporary unknown basic probability assignment which are associated with each target for each of the cells, to calculate a new temporary movable body occupancy basic probability assignment, a new temporary movable body non-occupancy basic probability assignment, and a new temporary unknown basic probability assignment of each of the cells;

a basic probability assignment update unit (616) to combine the three basic probability assignments of each of the cells in an immediately preceding measurement cycle, and the new temporary movable body occupancy basic probability assignment, the new temporary movable body non-occupancy basic probability assignment, and the new temporary unknown basic probability assignment in a current measurement cycle for each of the cells, to finally calculate the three basic probability assignments of each of the cells in the current measurement cycle;

a probability transformation unit (617) to transform the three final basic probability assignments of each of the cells in the current measurement cycle into a movable body occupancy probability of each of the cells in measurement cycles containing up to the current measurement cycle; and an occupancy grid map generation unit (613B) to assign the movable body occupancy probability in the measurement cycles containing up to the current measurement cycle, as the movable body occupancy probability, to each of the cells, to generate an occupancy grid map.

Additional Remark 9

A seatbelt reminder system of Additional Remark 9 is a seatbelt reminder system (400) including:
the physique estimation device (1, 1A, 1B) described in any one of Additional Remarks 1 to 8; and
a seat belt wearing determination device (200) to determine whether or not a seat belt is worn, and
the physique estimation device outputs an estimation result and
the seat belt wearing determination device includes:
a determination unit (201) to determine whether or not a seat belt corresponding to the position of a non-static object present in the vehicle cabin is worn on the basis of the estimation result; and
a notification unit (202) to provide, by sound or display, an alert when the determination unit determines that the seat belt is not worn.

Additional Remark 10

An airbag control system of Additional Remark 10 is an airbag control system (500) including: the physique estimation device (1, 1A, 1B) described in any one of Additional Remarks 1 to 8; and an air bag control device (300) to control the operation of an airbag, and
the physique estimation device outputs an estimation result and
the air bag control device includes:
a physique determination unit (301) to determine the size of the physique of a non-static object present in the vehicle cabin on the basis of the estimation result, and to output a determination result; and
an airbag control unit (302) to control the operation of an airbag corresponding to the position of the non-static object present in the vehicle cabin on the basis of the determination result.

Additional Remark 11

A physique estimation method of Additional Remark 11 includes the steps of:
transmitting a transmission wave;
receiving the transmission wave reflected by at least one target in a vehicle cabin as a received wave;
acquiring position information about a reflection point where the transmission wave is reflected using the received wave; and
estimating the physique of a non-static object in the vehicle cabin using the position information.

It is possible to combine embodiments, and to modify and omit each embodiment as appropriate.

INDUSTRIAL APPLICABILITY

Because the physique estimation device according to the present disclosure can estimate the physique of a movable body, the physique estimation device can be used as a device that estimates the physique of an occupant in a vehicle cabin.

REFERENCE SIGNS LIST 1 (1A, 1B) physique estimation device, 10 sensor, 20 transmission antenna, 21 transmission circuit, 22 voltage generator, 23 voltage control oscillator, 24 splitter, 25 amplifier, $30_0$ to $30_{Q-1}$ reception antenna, $31_0$ to $31_{Q-1}$ receiver, $32_0$ to $32_{Q-1}$ low noise amplifier, $33_0$ to $33_{Q-1}$ mixer, $34_0$ to $34_{Q-1}$ IF amplifier, $35_0$ to $35_{Q-1}$ filter, $36_0$ to $36_{Q-1}$ ADC, 41 signal processor, 45 control unit, 46 data storage unit, 47 signal processing unit, 48 movable body extraction unit, 49 frequency analysis unit, 61 (61A, 61B) physique estimation unit, 63 map storage unit, 100 processing circuit, 101 processor, 102 memory, 200 seat belt wearing determination device, 300 air bag control device, 400 seatbelt reminder system, 491 position information calculation unit, 492 coordinate transformation unit, 500 airbag control system, 611 (611A) occupancy probability calculation unit, 612 (612A, 612Aa) occupancy probability update unit, 613 (613A, 613B) occupancy grid map generation unit, 614 target determination unit, 615 basic probability assignment calculation unit, 616 basic probability assignment updating unit, 617 probability transformation unit, 4911 range Doppler processing unit, 4912 integration processing unit, 4913 peak extraction processing unit, and 4914 peak angle measurement processing unit.

The invention claimed is:
1. A physique estimation device comprising:
a sensor having a transmission antenna to transmit a transmission wave comprising multiple chirps whose frequencies rise or fall, a reception antenna to receive the transmission wave reflected by multiple targets in a vehicle cabin as a received wave, and a mixer to mix the transmission wave and the received wave to generate beat signals; and
processing circuitry
to acquire position information about a reflection point where the transmission wave is reflected, using the received wave and analyzing the beat signals; and
to estimate a physique of a non-static object present in the vehicle cabin using the position information, wherein
the processing circuitry determines a movable body occupancy probability showing a probability of presence of a non-static object in each of multiple cells contained in three-dimensional grid space and showing an inside of the vehicle cabin, and estimates a spatial extent of cells whose movable body occupation probabilities are greater than or equal to a threshold as the physique of the non-static object present in the vehicle cabin, and wherein
the processing circuitry is further configured:
to determine whether a detected target is a non-static object or a static object;
to,
when a non-static object is detected in a case where either multiple non-static objects or at least one non-static object and at least one static object are detected as the multiple targets, set a temporary movable body occupancy probability of one or more cells corresponding to a position of the detected non-static object to a value close to 1, set a temporary movable body occupancy probability of each cell at a position between the position of the detected non-static object and the sensor to a value which asymptotically varies to 0 with distance from the position of the detected non-static object toward the sensor, and set a temporary movable body occupancy probability of each cell at a position which is away from the position of the non-static object when viewed from the sensor to 0.5, when a static object is detected in the above case, set a temporary movable body occupancy probability of each of one or more cells corresponding to a position of the detected static object, and a temporary movable body occupancy probability of each cell which is away from the position of the detected static object when viewed from the sensor to 0.5, and set a temporary movable body occupancy probability of each cell at a position between the position of the detected static object and the sensor to a value which asymptotically varies to 0 with distance from the position of the detected static object toward the sensor, when multiple non-static objects are detected in the above case, determine a product of one or more temporary movable body occupation probabilities which are set when a non-static object is detected for each of the cells, to update it as a new temporary movable body occupancy probability of the cell, or when at least one non-static object and at least one static object are detected in the above case, determine a product of one or more temporary movable body occupation probabilities which are set when a non-static object is detected and one or more temporary movable body occupation probabilities which are set when a static object is detected for each of the cells, and to calculate the product as a new temporary movable body occupancy probability of the cell;

to determine, as to the movable body occupancy probability of each of the cells, a weighted average of the movable body occupancy probability in measurement cycles containing up to an immediately preceding measurement cycle and the temporary movable body occupancy probability in a current measurement cycle as the movable body occupancy probability in measurement cycles containing up to the current measurement cycle; and to assign the movable body occupancy probability in the measurement cycles containing up to the current measurement cycle to each of the cells as the movable body occupancy probability, and generate an occupancy grid map.

2. The physique estimation device according to claim 1, wherein the processing circuitry analyzes the beat signals by performing a range FFT, a Doppler FFT, and an angle FFT on the beat signals.

3. A physique estimation device comprising:

a sensor having a transmission antenna to transmit a transmission wave comprising multiple chirps whose frequencies rise or fall, a reception antenna to receive the transmission wave reflected by multiple targets in a vehicle cabin as a received wave, and a mixer to mix the transmission wave and the received wave to generate beat signals; and processing circuitry to acquire position information about a reflection point where the transmission wave is reflected, using the received wave and analyzing the beat signals; and to estimate a physique of a non-static object present in the vehicle cabin using the position information, wherein the processing circuitry determines a movable body occupancy probability showing a probability of presence of a non-static object in each of multiple cells contained in three-dimensional grid space and showing an inside of the vehicle cabin, and estimates a spatial extent of cells whose movable body occupation probabilities are greater than or equal to a threshold as the physique of the non-static object present in the vehicle cabin, and wherein the processing circuitry is further configured:

to determine whether a detected target is a non-static object or a static object;

to,
  when a non-static object is detected in a case where either multiple non-static objects or at least one non-static object and at least one static object are detected as the multiple targets, set a temporary movable body occupancy probability of one or more cells corresponding to a position of the detected non-static object to a value close to 1, set a temporary movable body occupancy probability of each cell at a position between the position of the detected non-static object and the sensor to a value which asymptotically varies to 0 with distance from the position of the detected non-static object toward the sensor, and set a temporary movable body occupancy probability of each cell at a position which is away from the position of the non-static object when viewed from the sensor to 0.5, when a static object is detected in the above case, set a temporary movable body occupancy probability of each of one or more cells corresponding to a position of the detected static object, and a temporary movable body occupancy probability of each cell which is away from the position of the detected static object when viewed from the sensor to 0.5, and set a temporary movable body occupancy probability of each cell at a position between the position of the detected static object and the sensor to a value which asymptotically varies to 0 with distance from the position of the detected static object toward the sensor, when the multiple non-static objects are detected in the above case, determine a product of one or more temporary movable body occupation probabilities which are set when a non-static object is detected for each of the cells, to update it as a new temporary movable body occupancy probability of the cell, or when the at least one non-static object and the at least one static object are detected in the above case, determine a product of one or more temporary movable body occupation probabilities which are set when a non-static object is detected and one or more temporary movable body occupation probabilities which are set when a static object is detected for each of the cells, and calculate the product as a new temporary movable body occupancy probability of the cell;

to calculate, as to each of the cells, log odds of the movable body occupancy probability in measurement cycles containing up to a current measurement cycle, as a sum of log odds of the temporary movable body occupancy probability in measurement cycles containing up to an immediately preceding measurement cycle and log odds of the movable body occupancy probability in the current measurement cycle, and to determine the movable body occupancy probability in the measurement cycles containing up to the current measurement cycle from the calculated log odds of the movable body occupancy probability in the measurement cycles containing up to the current measurement cycle; and to assign the movable body occupancy probability in the measurement cycles containing up to the current measurement cycle, as the movable body occupancy probability, to each of the cells, and generate an occupancy grid map.

4. The physique estimation device according to claim 3, wherein the processing circuitry analyzes the beat signals by performing a range FFT, a Doppler FFT, and an angle FFT on the beat signals.

5. A physique estimation device comprising:
a sensor having a transmission antenna to transmit a transmission wave comprising multiple chirps whose frequencies rise or fall, a reception antenna to receive the transmission wave reflected by multiple targets in a vehicle cabin as a received wave, and a mixer to mix the transmission wave and the received wave to generate beat signals; and
processing circuitry
to acquire position information about a reflection point where the transmission wave is reflected, using the received wave and analyzing the beat signals; and
to estimate a physique of a non-static object present in the vehicle cabin using the position information, wherein
the processing circuitry determines a movable body occupancy probability showing a probability of presence of a non-static object in each of multiple cells contained in three-dimensional grid space and showing an inside of the vehicle cabin, and estimates a spatial extent of cells whose movable body occupation probabilities are greater than or equal to a threshold as the physique of the non-static object present in the vehicle cabin, and wherein the processing circuitry is further configured:
to determine whether a detected target is a non-static object or a static object;
to calculate three basic probability assignments including a movable body occupancy basic probability assignment showing that a non-static object is present, a movable body non-occupancy basic probability assignment showing that no non-static object is present, and an unknown basic probability assignment showing that whether a non-static object is present is unknown in every measurement cycle, to,
when a non-static body is detected, set a temporary movable body occupancy basic probability assignment of one or more cells corresponding to a position of the detected non-static body in such a way that the temporary movable body occupancy basic probability assignment is close to 1, and set a temporary movable body occupancy basic probability assignment of any cell other than the one or more cells corresponding to the position of the detected non-static body in such a way that the temporary movable body occupancy basic probability assignment asymptotically varies to 0 with distance from the position of the detected non-static body, and, as to every cell, set a temporary unknown basic probability assignment to a value which is obtained by subtracting a temporary movable body occupancy basic probability assignment of the cell from 1, when a static object is detected, set a temporary movable body non-occupancy basic probability assignment of one or more cells corresponding to a position of the sensor in such a way that the temporary movable body non-occupancy basic probability assignment is close to 1, and set a temporary movable body non-occupancy basic probability assignment of any cell other than the one or more cells corresponding to the position of the sensor in such a way that the temporary movable body non-occupancy basic probability assignment asymptotically varies to 0 with distance from the position of the sensor toward a position of the detected static object, and, as to every cell, set a temporary unknown basic probability assignment to a value which is obtained by subtracting a temporary movable body non-occupancy basic probability assignment of the cell from 1, or when the multiple targets include either multiple non-static bodies or at least one non-static body and at least one static object, combine a temporary movable body occupancy basic probability assignment or a temporary movable body non-occupancy basic probability assignment, and a temporary unknown basic probability assignment which are associated with each target for each of the cells, to calculate a new temporary movable body occupancy basic probability assignment, a new temporary movable body non-occupancy basic probability assignment, and a new temporary unknown basic probability assignment of each of the cells;

to combine the three basic probability assignments of each of the cells in an immediately preceding measurement cycle, and the new temporary movable body occupancy basic probability assignment, the new temporary movable body non-occupancy basic probability assignment, and the new temporary unknown basic probability assignment in a current measurement cycle for each of the cells, to finally calculate the three basic probability assignments of each of the cells in the current measurement cycle;

to transform the three final basic probability assignments of each of the cells in the current measurement cycle into a movable body occupancy probability of each of the cells in measurement cycles containing up to the current measurement cycle; and to assign the movable body occupancy probability in the measurement cycles containing up to the current measurement cycle, as the movable body occupancy probability, to each of the cells, to generate an occupancy grid map.

6. The physique estimation device according to claim 5, wherein the processing circuitry analyzes the beat signals by performing a range FFT, a Doppler FFT, and an angle FFT on the beat signals.

7. A seatbelt reminder system including
the physique estimation device according to claim 1, and
a seat belt wearing determination device to determine whether or not a seat belt is worn, wherein
the physique estimation device outputs an estimation result, and wherein the seat belt wearing determination device includes a processor:
to determine whether or not a seat belt corresponding to a position of a non-static object present in the vehicle cabin is worn on a basis of the estimation result; and
to provide, by sound or display, an alert when it is determined that the seat belt is not worn.

8. A seatbelt reminder system including
the physique estimation device according to claim 3, and
a seat belt wearing determination device to determine whether or not a seat belt is worn, wherein
the physique estimation device outputs an estimation result, and wherein
the seat belt wearing determination device includes a processor:
to determine whether or not a seat belt corresponding to a position of a non-static object present in the vehicle cabin is worn on a basis of the estimation result; and
to provide, by sound or display, an alert when it is determined that the seat belt is not worn.

9. A seatbelt reminder system including
the physique estimation device according to claim 5, and
a seat belt wearing determination device to determine whether or not a seat belt is worn, wherein
the physique estimation device outputs an estimation result, and wherein
the seat belt wearing determination device includes a processor:
to determine whether or not a seat belt corresponding to a position of a non-static object present in the vehicle cabin is worn on a basis of the estimation result; and
to provide, by sound or display, an alert when it is determined that the seat belt is not worn.

10. An airbag control system including
the physique estimation device according to claim 1, and
an air bag control device to control an operation of an airbag, wherein
the physique estimation device outputs an estimation result, and wherein
the air bag control device includes a processor:
to determine a size of a physique of a non-static object present in the vehicle cabin on a basis of the estimation result, and to output a determination result; and
to control an operation of an airbag corresponding to a position of the non-static object present in the vehicle cabin on a basis of the determination result.

11. An airbag control system including
the physique estimation device according to claim 3, and
an air bag control device to control an operation of an airbag, wherein
the physique estimation device outputs an estimation result, and wherein
the air bag control device includes a processor:
to determine a size of a physique of a non-static object present in the vehicle cabin on a basis of the estimation result, and to output a determination result; and
to control an operation of an airbag corresponding to a position of the non-static object present in the vehicle cabin on a basis of the determination result.

12. An airbag control system including
the physique estimation device according to claim 5, and
an air bag control device to control an operation of an airbag, wherein
the physique estimation device outputs an estimation result, and wherein
the air bag control device includes a processor:
to determine a size of a physique of a non-static object present in the vehicle cabin on a basis of the estimation result, and to output a determination result; and
to control an operation of an airbag corresponding to a position of the non-static object present in the vehicle cabin on a basis of the determination result.

13. A physique estimation method comprising:
transmitting a transmission wave comprising multiple chirps whose frequencies rise or fall;
receiving the transmission wave reflected by multiple targets in a vehicle cabin as a received wave;
mixing the transmission wave and the received wave to generate beat signals;
acquiring position information about a reflection point where the transmission wave is reflected, using the received wave and analyzing the beat signals; and
estimating the physique of a non-static object in the vehicle cabin using the position information, wherein the method further comprising:
determining a movable body occupancy probability showing a probability of presence of a non-static object in each of multiple cells contained in three-dimensional grid space and showing an inside of the vehicle cabin, and estimating a spatial extent of cells whose movable body occupation probabilities are greater than or equal to a threshold as the physique of the non-static object present in the vehicle cabin, and
determining whether a detected target is a non-static object or a static object;
when a non-static object is detected in a case where either multiple non-static objects or at least one non-static object and at least one static object are detected as the multiple targets, setting a temporary movable body occupancy probability of one or more cells corresponding to a position of the detected non-static object to a value close to 1, setting a temporary movable body occupancy probability of each cell at a position between the position of the detected non-static object and the sensor to a value which asymptotically varies to 0 with distance from the position of the detected non-static object toward the sensor, and setting a temporary movable body occupancy probability of each cell at a position which is away from the position of the non-static object when viewed from the sensor to 0.5,
when a static object is detected in the above case, setting a temporary movable body occupancy probability of each of one or more cells corresponding to a position of the detected static object, and a temporary movable body occupancy probability of each cell which is away from the position of the detected static object when viewed from the sensor to 0.5, and setting a temporary movable body occupancy probability of each cell at a position between the position of the detected static object and the sensor to a value which asymptotically varies to 0 with distance from the position of the detected static object toward the sensor,
when multiple non-static objects are detected in the above case, determining a product of one or more temporary movable body occupation probabilities which are set when a non-static object is detected for each of the cells, and updating the product as a new temporary movable body occupancy probability of the cell, or when at least one non-static object and at least one static object are detected in the above case, determining a product of one or more temporary movable body occupation probabilities which are set when a non-static object is detected and one or more temporary movable body occupation probabilities which are set when a static object is detected for each of the cells, and calculating the product as a new temporary movable body occupancy probability of the cell;

determining, as to the movable body occupancy probability of each of the cells, a weighted average of the movable body occupancy probability in measurement cycles containing up to an immediately preceding measurement cycle and the temporary movable body occupancy probability in a current measurement cycle as the movable body occupancy probability in measurement cycles containing up to the current measurement cycle; and assigning the movable body occupancy probability in the measurement cycles containing up to the current measurement cycle to each of the cells as the movable body occupancy probability and generating an occupancy grid map.

14. A physique estimation method comprising:

transmitting a transmission wave comprising multiple chirps whose frequencies rise or fall;

receiving the transmission wave reflected by multiple targets in a vehicle cabin as a received wave;

mixing the transmission wave and the received wave to generate beat signals;

acquiring position information about a reflection point where the transmission wave is reflected, using the received wave and analyzing the beat signals; and estimating the physique of a non-static object in the vehicle cabin using the position information, wherein the method further comprising:

determining a movable body occupancy probability showing a probability of presence of a non-static object in each of multiple cells contained in three-dimensional grid space and showing an inside of the vehicle cabin, and estimating a spatial extent of cells whose movable body occupation probabilities are greater than or equal to a threshold as the physique of the non-static object present in the vehicle cabin, and determining whether a detected target is a non-static object or a static object;

when a non-static object is detected in a case where either multiple non-static objects or at least one non-static object and at least one static object are detected as the multiple targets, setting a temporary movable body occupancy probability of one or more cells corresponding to a position of the detected non-static object to a value close to 1, setting a temporary movable body occupancy probability of each cell at a position between the position of the detected non-static object and the sensor to a value which asymptotically varies to 0 with distance from the position of the detected non-static object toward the sensor, and setting a temporary movable body occupancy probability of each cell at a position which is away from the position of the non-static object when viewed from the sensor to 0.5, when a static object is detected in the above case, setting a temporary movable body occupancy probability of each of one or more cells corresponding to a position of the detected static object, and a temporary movable body occupancy probability of each cell which is away from the position of the detected static object when viewed from the sensor to 0.5, and setting a temporary movable body occupancy probability of each cell at a position between the position of the detected static object and the sensor to a value which asymptotically varies to 0 with distance from the position of the detected static object toward the sensor, when the multiple non-static objects are detected in the above case, determining a product of one or more temporary movable body occupation probabilities which are set when a non-static object is detected for each of the cells, and updating the product as a new temporary movable body occupancy probability of the cell, or when the at least one non-static object and the at least one static object are detected in the above case, determining a product of one or more temporary movable body occupation probabilities which are set when a non-static object is detected and one or more temporary movable body occupation probabilities which are set when a static object is detected for each of the cells, and calculating the product as a new temporary movable body occupancy probability of the cell;

calculating, as to each of the cells, log odds of the movable body occupancy probability in measurement cycles containing up to a current measurement cycle, as a sum of log odds of the temporary movable body occupancy probability in measurement cycles containing up to an immediately preceding measurement cycle and log odds of the movable body occupancy probability in the current measurement cycle, and determining the movable body occupancy probability in the measurement cycles containing up to the current measurement cycle from the calculated log odds of the movable body occupancy probability in the measurement cycles containing up to the current measurement cycle; and assigning the movable body occupancy probability in the measurement cycles containing up to the current measurement cycle, as the movable body occupancy probability, to each of the cells, and generate an occupancy grid map.

15. A physique estimation method comprising:

transmitting a transmission wave comprising multiple chirps whose frequencies rise or fall;

receiving the transmission wave reflected by multiple targets in a vehicle cabin as a received wave;

mixing the transmission wave and the received wave to generate beat signals;

acquiring position information about a reflection point where the transmission wave is reflected, using the received wave and analyzing the beat signals; and estimating the physique of a non-static object in the vehicle cabin using the position information, wherein the method further comprising:

determining a movable body occupancy probability showing a probability of presence of a non-static object in each of multiple cells contained in three-dimensional grid space and showing an inside of the vehicle cabin, and estimating a spatial extent of cells whose movable body occupation probabilities are greater than or equal to a threshold as the physique of the non-static object present in the vehicle cabin, and determining whether a detected target is a non-static object or a static object;

calculating three basic probability assignments including a movable body occupancy basic probability assignment showing that a non-static object is present, a movable body non-occupancy basic probability assignment showing that no non-static object is present, and an unknown basic probability assignment showing that whether a non-static object is present is unknown in every measurement cycle, when a non-static body is detected, setting a temporary movable body occupancy basic probability assignment of one or more cells corresponding to a position of the detected non-static body in such a way that the temporary movable body occupancy basic probability assignment is close to 1, and setting a temporary movable body occupancy basic probability assignment of any cell other than the one or more cells corresponding to the position of the detected non-static body in such a way that the temporary movable body occupancy basic probability assignment asymptotically varies to 0 with distance from the position of the detected non-static body, and, as to every cell, setting a temporary unknown basic probability assignment to a value which is obtained by subtracting a temporary movable body occupancy basic probability assignment of the cell from 1, when a static object is detected, setting a temporary movable body non-occupancy basic probability assignment of one or more cells corresponding to a position of the sensor in such a way that the temporary movable body non-occupancy basic probability assignment is close to 1, and setting a temporary movable body non-occupancy basic probability assignment of any cell other than the one or more cells corresponding to the position of the sensor in such a way that the temporary movable body non-occupancy basic probability assignment asymptotically varies to 0 with distance from the position of the sensor toward a position of the detected static object, and, as to every cell, setting a temporary unknown basic probability assignment to a value which is obtained by subtracting a temporary movable body non-occupancy basic probability assignment of the cell from 1, or when the multiple targets include either multiple non-static bodies or at least one non-static body and at least one static object, combining a temporary movable body occupancy basic probability assignment or a temporary movable body non-occupancy basic probability assignment, and a temporary unknown basic probability assignment which are associated with each target for each of the cells, and calculating a new temporary movable body occupancy basic probability assignment, a new temporary movable body non-occupancy basic probability assignment, and a new temporary unknown basic probability assignment of each of the cells;

combining the three basic probability assignments of each of the cells in an immediately preceding measurement cycle, and the new temporary movable body occupancy basic probability assignment, the new temporary movable body non-occupancy basic probability assignment, and the new temporary unknown basic probability assignment in a current measurement cycle for each of the cells, and finally calculating the three basic probability assignments of each of the cells in the current measurement cycle;

transforming the three final basic probability assignments of each of the cells in the current measurement cycle into a movable body occupancy probability of each of the cells in measurement cycles containing up to the current measurement cycle; and assigning the movable body occupancy probability in the measurement cycles containing up to the current measurement cycle, as the movable body occupancy probability, to each of the cells, and generating an occupancy grid map.

* * * * *